United States Patent
Dinan et al.

(10) Patent No.: US 10,334,581 B2
(45) Date of Patent: Jun. 25, 2019

(54) TRANSPORT BLOCK TRANSMISSION IN A WIRELESS DEVICE AND WIRELESS NETWORK

(71) Applicant: Ofinno Technologies, LLC, Herndon, VA (US)

(72) Inventors: Esmael Hejazi Dinan, Herndon, VA (US); Alireza Babaei, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 62 days.

(21) Appl. No.: 15/714,623

(22) Filed: Sep. 25, 2017

(65) Prior Publication Data

US 2018/0092071 A1 Mar. 29, 2018

Related U.S. Application Data

(60) Provisional application No. 62/399,381, filed on Sep. 24, 2016.

(51) Int. Cl.
| | |
|---|---|
| *H04W 4/00* | (2018.01) |
| *H04W 72/04* | (2009.01) |
| *H04L 1/00* | (2006.01) |
| *H04L 1/18* | (2006.01) |
| *H04W 72/12* | (2009.01) |

(52) U.S. Cl.
CPC ......... *H04W 72/042* (2013.01); *H04L 1/0058* (2013.01); *H04L 1/1812* (2013.01); *H04L 1/1819* (2013.01); *H04L 1/1822* (2013.01); *H04L 1/1887* (2013.01); *H04W 72/1273* (2013.01); *H04W 72/1289* (2013.01)

(58) Field of Classification Search
None
See application file for complete search history.

(56) References Cited

U.S. PATENT DOCUMENTS

| | | |
|---|---|---|
| 2016/0095101 A1 | 3/2016 | Ye et al. |
| 2018/0332566 A1* | 11/2018 | You .......................... H04L 1/06 |

OTHER PUBLICATIONS

3GPP TR 36.889 V1.0.1 (Jun. 2015), Technical Report, 3rd Generation Partnership Project; Technical Specification Group Radio Access Network; Study on Licensed-Assisted Access to Unlicensed Spectrum; (Release 13).

(Continued)

*Primary Examiner* — Erika A Washington
(74) *Attorney, Agent, or Firm* — David Grossman; Esmael Dinan; Kavon Nasabzadeh

(57) ABSTRACT

A received first DCI comprises: a first trigger field (indicating that the first DCI is triggered in response to a second DCI comprising a second trigger), a validation field (indicating a validation duration for receiving the second DCI validating the first DCI), a hybrid retransmission request (HARQ) identifier field, and a new data identifier (NDI) field. TBs are created in response to the first DCI. In response to monitoring not detecting the second DCI: the first DCI is invalidated and transmission of TBs dropped; the HARQ process ID and the NDI are stored; and the first TBs are stored in a HARQ buffer. A third DCI indicating a same value of the HARQ process ID is received. Uplink signals are transmitted in response to the third DCI. The stored NDI are employed to determine an adaptive-retransmission of the TBs or a new transmission of second TBs.

20 Claims, 18 Drawing Sheets

(56) References Cited

OTHER PUBLICATIONS

3GPP TS 36.213 V13.0.1 (Jan. 2016).
3GPP TS 36.300 V13.2.0 (Dec. 2015), Technical Specification, 3rd Generation Partnership Project; Technical Specification Group Radio Access Network; Evolved Universal Terrestrial Radio Access (E-UTRA)and Evolved Universal Terrestrial Radio Access Network (E-UTRAN); Overall description; Stage 2 (Release 13).
3GPP TS 36.321 V13.1.0 (Mar. 2016), Technical Specification, 3rd Generation Partnership Project; Technical Specification Group Radio Access Network; Evolved Universal Terrestrial Radio Access (E-UTRA);Medium Access Control (MAC) protocol specification (Release 13).
3GPP TS 36.331 V13.0.0 (Dec. 2015), Technical Specification, 3rd Generation Partnership Project; Technical Specification Group Radio Access Network; Evolved Universal Terrestrial Radio Access (E-UTRA);Radio Resource Control (RRC); Protocol specification (Release 13).
R1-160885, 3GPP TSG RAN WG1 #84, Feb., 15-19, 2016, St. Julian's, Malta, Agenda item: 7.3.1.1, Source: Qualcomm Incorporated, Title: Control details for UL in LAA.
R1-162784, 3GPP TSG RAN WG1 Meeting #84bis, Busan, Korea, Apr. 11-15, 2016, Agenda item: 7.3.1.1, Source: Nokia, Alcatel-Lucent Shanghai Bell, Title: On LAA UL scheduling and UL grant enhancements.
R1-163022, 3GPP TSG RAN WG1 #84bis, Apr. 11-15, 2016, Busan, Korea, Agenda item: 7.3.1.1, Source: Qualcomm Incorporated, Title: Control details for UL scheduling in LAA.
R1-163140, 3GPP TSG-RAN WG1#84BIS, Busan, Korea, Apr. 11-15, 2016, Source: Ericsson, Title: Multi-subframe scheduling design for Enhanced LAA.
R1-164409, 3GPP TSG RAN WG1 #85, May 23-27, 2016, Nanjing, China, Agenda item: 6.2.1.1, Source: Qualcomm Incorporated, Title: Control details for UL scheduling in eLAA.
R1-164410, 3GPP TSG RAN WG1 #85, May 23-27, 2016, Nanjing, China, Agenda item: 6.2.1.1 Source: Qualcomm Incorporated, Title: DCI design for PUSCH scheduling in eLAA.
R1-164741, 3GPP TSG RAN WG1 #85, Nanjing, China, May 23-27, 2016, Agenda item: 6.2.1.1, Source: Samsung, Title: PUSCH Scheduling for LAA.
R1-164942, 3GPP TSG RAN WG1 Meeting #85, Nanjing, China, May 23-27, 2016, Agenda item: 6.2.1.1, Source: Nokia, Alcatel-Lucent Shanghai Bell, Title: On Two-Stage UL scheduling for eLAA.
R1-165142, 3GPP TSG-RAN WG1#85, Nanjing, China, May 23-27, 2016, Source: Ericsson, Title: Multi-subframe scheduling design for Enhanced LAA.
R1-165252, 3GPP TSG RAN WG1 Meeting #85, Nanjing, China May 23-27, 2016, Source: WILUS Inc., Title: Consideration on UL LBT Type Switching for eLAA.
R1-165923, 3GPP TSG RAN WG1 #85, Busan, Korea, May 23-27, 2016, Title: Way Forward on supporting trigger based transmission for UL in eLAA.
R1-166137, 3GPP TSG RAN WG1 Meeting #86, Gothenburg, Sweden, Aug. 22-26, 2016, Agenda Item: 7.2.1.1, Source: Huawei, HiSilicon, Title: Two-stage scheduling for eLAA.
R1-166252, 3GPP TSG RAN WG1 #86, Aug. 22-26, 2016, Gothenburg, Sweden, Agenda item: 7.2.1.1, Source: Qualcomm Incorporated, Title: Control details for UL scheduling in eLAA.
R1-166987, 3GPP TSG RAN WG1 Meeting #86, Gothenburg, Sweden Aug. 22-26, 2016, Source: ZTE, Title: Remaining details of PUSCH design for eLAA.
R1-167074, 3GPP TSG RAN WG1 Meeting #86, Gothenburg, Sweden, Aug. 22-26, 2016, Agenda item: 7.2.1.1, Source: Nokia, Alcatel-Lucent Shanghai Bell, Title: On Two-Stage UL scheduling for eLAA.
Canadian Examiner's Report dated Apr. 8, 2019, in CA Patent Application No. 3,038,086.

* cited by examiner

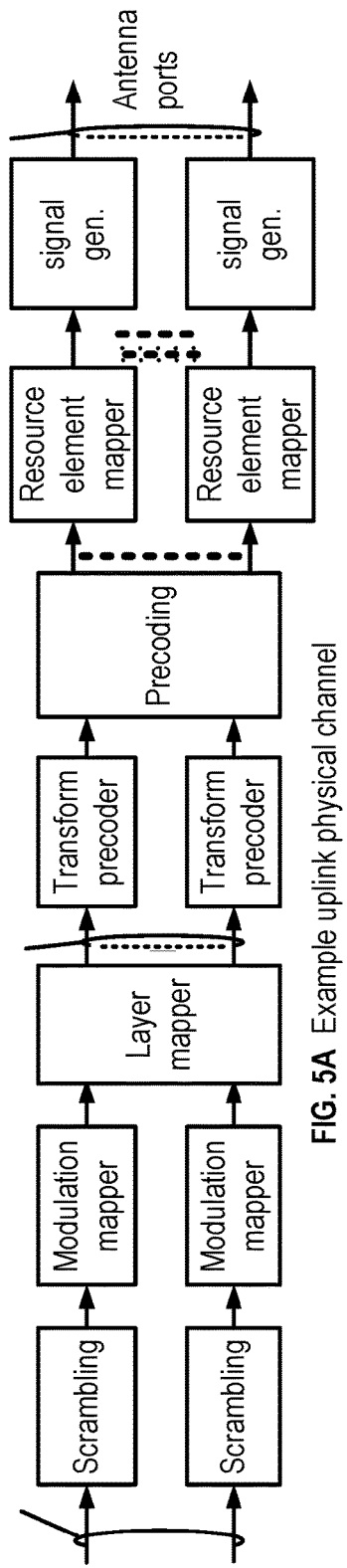
FIG. 5A Example uplink physical channel
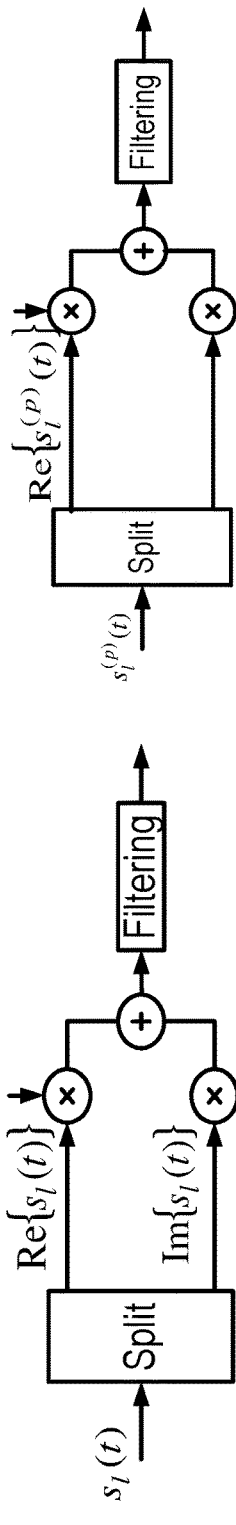
FIG. 5B Example uplink modulation
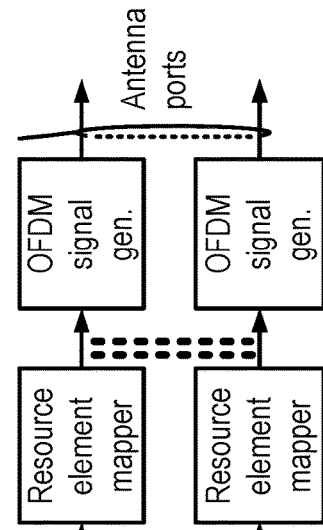
FIG. 5D Example downlink modulation
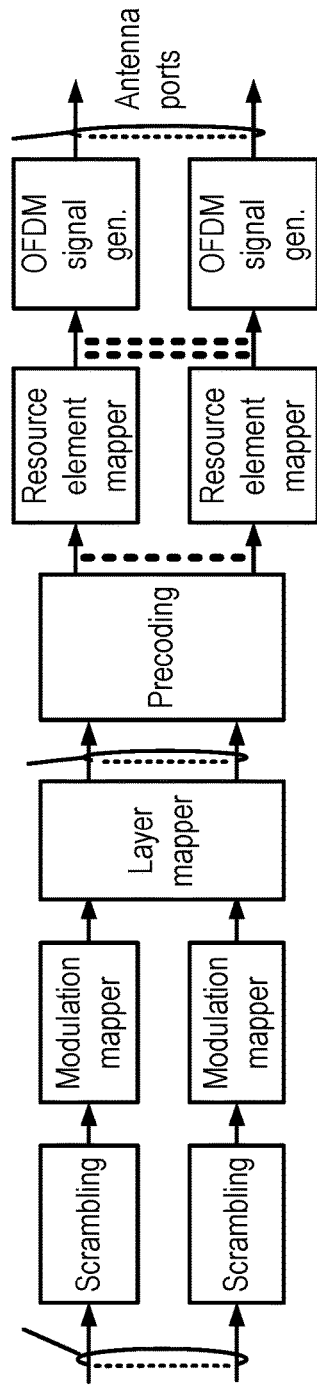
FIG. 5C Example downlink physical channel Dual-Connectivity at eNB

| R | $C_1$ | $C_2$ | $C_3$ | $C_4$ | $C_5$ | $C_6$ | $C_7$ | Oct 1 |
|---|---|---|---|---|---|---|---|---|

Example Activation/Deactivation MAC control element of one octet

| R | $C_1$ | $C_2$ | $C_3$ | $C_4$ | $C_5$ | $C_6$ | $C_7$ | Oct 1 |
|---|---|---|---|---|---|---|---|---|
| $C_8$ | $C_9$ | $C_{10}$ | $C_{11}$ | $C_{12}$ | $C_{13}$ | $C_{14}$ | $C_{15}$ | Oct 2 |
| $C_{16}$ | $C_{17}$ | $C_{18}$ | $C_{19}$ | $C_{20}$ | $C_{21}$ | $C_{22}$ | $C_{23}$ | Oct 3 |
| $C_{24}$ | $C_{25}$ | $C_{26}$ | $C_{27}$ | $C_{28}$ | $C_{29}$ | $C_{30}$ | $C_{31}$ | Oct 4 |

Example Activation/Deactivation MAC control element of four octets

FIG. 11

TRANSPORT BLOCK TRANSMISSION IN A WIRELESS DEVICE AND WIRELESS NETWORK

CROSS-REFERENCE TO RELATED APPLICATIONS

This application claims the benefit of U.S. Provisional Application No. 62/399,381, filed Sep. 24, 2016, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 11 depicts examples of activation/deactivation MAC control element as per an aspect of an embodiment of the present disclosure.

DETAILED DESCRIPTION OF EMBODIMENTS

Figure 1:
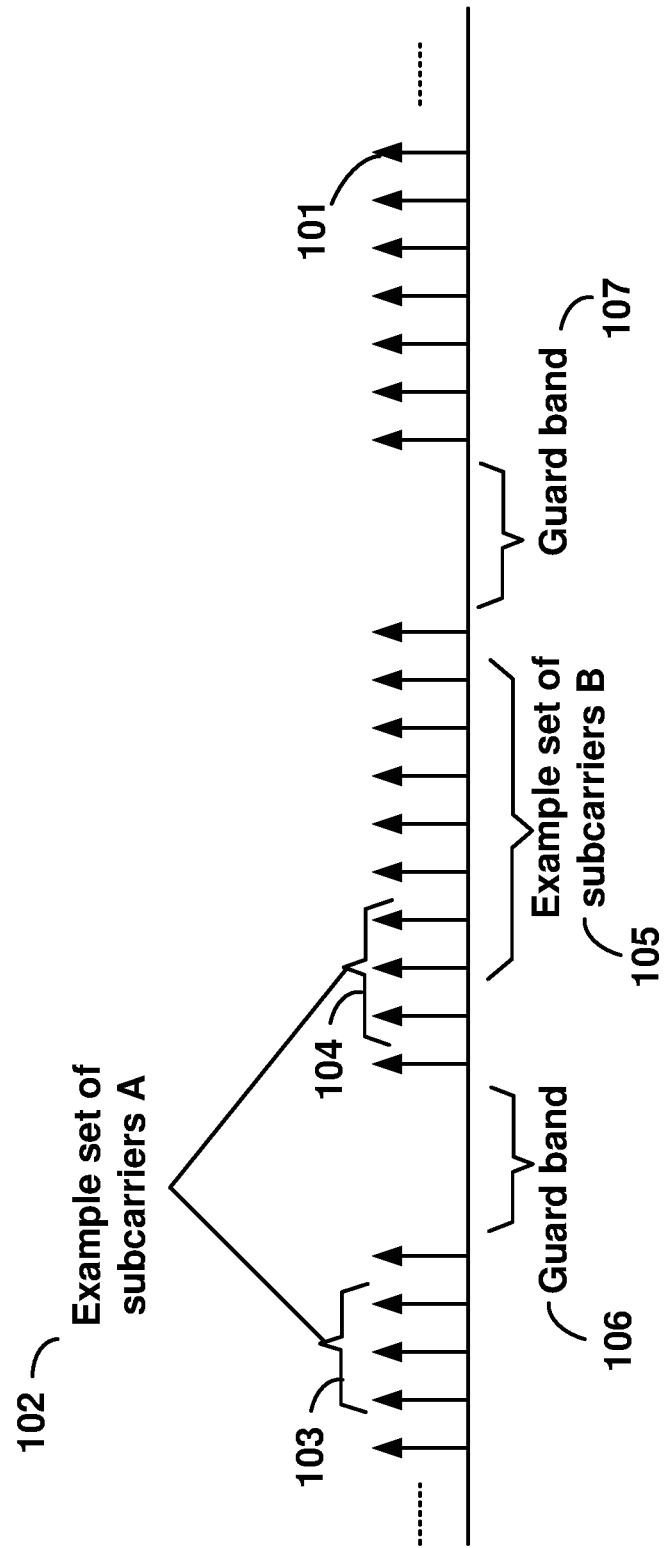
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
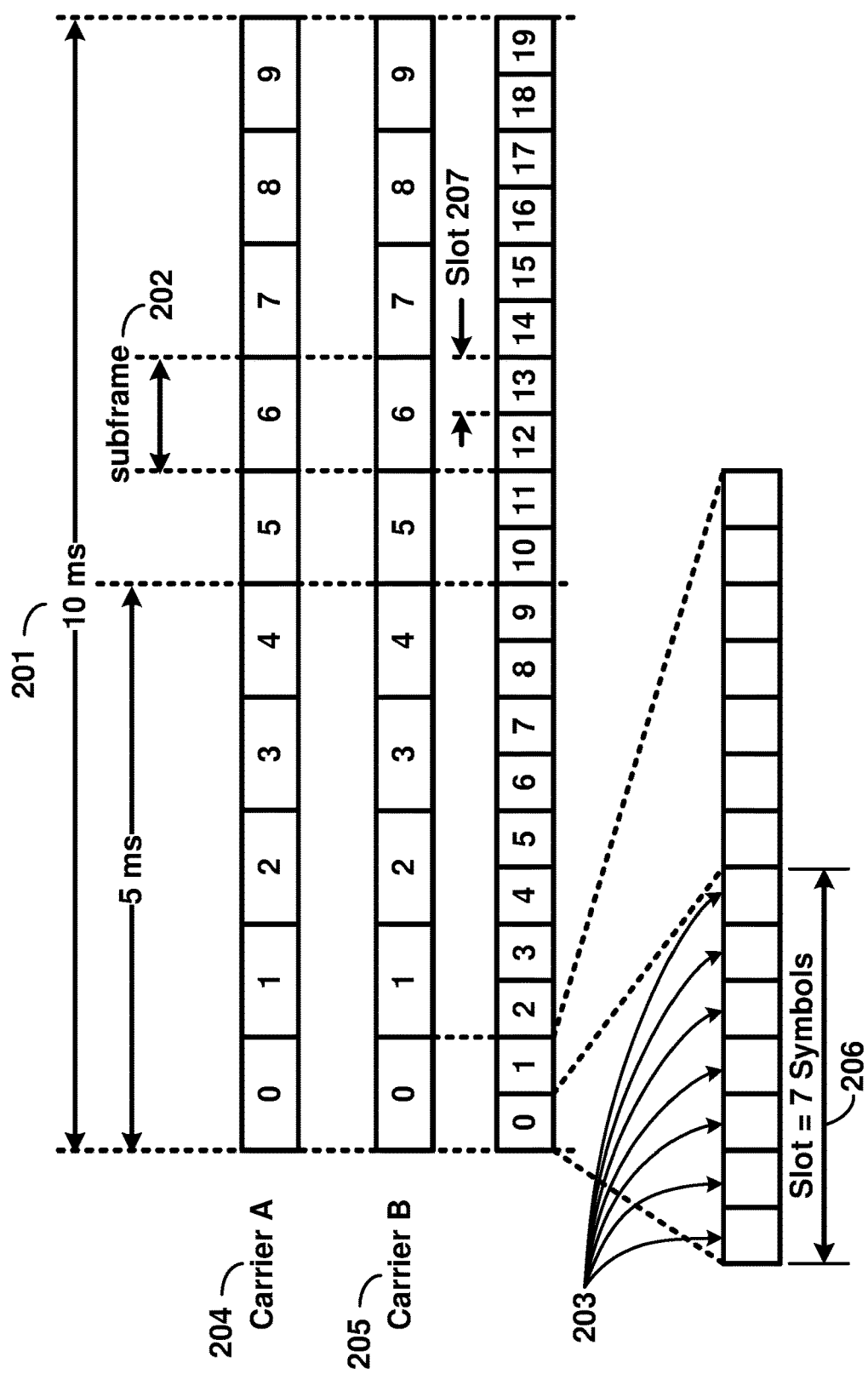
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
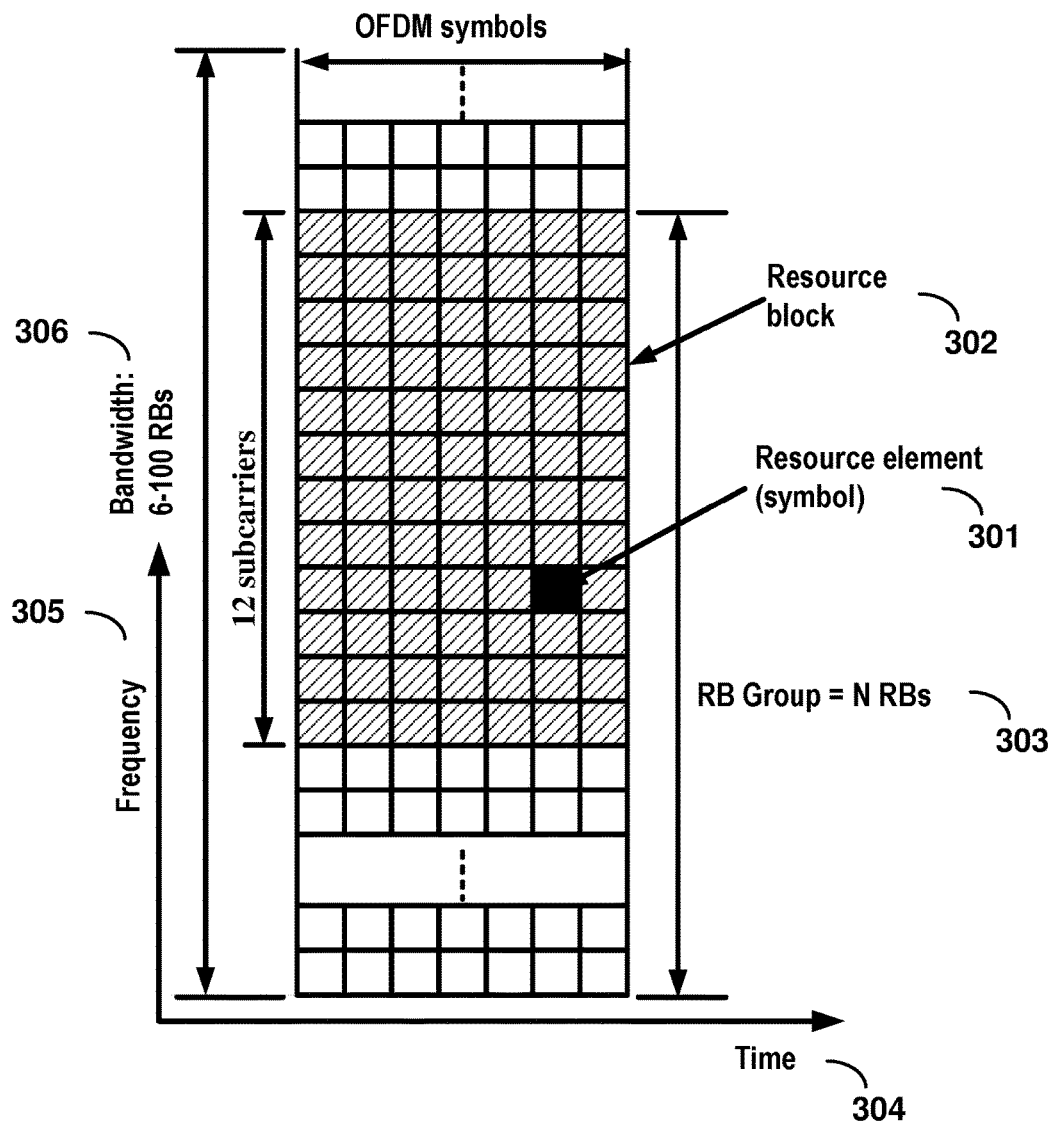
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
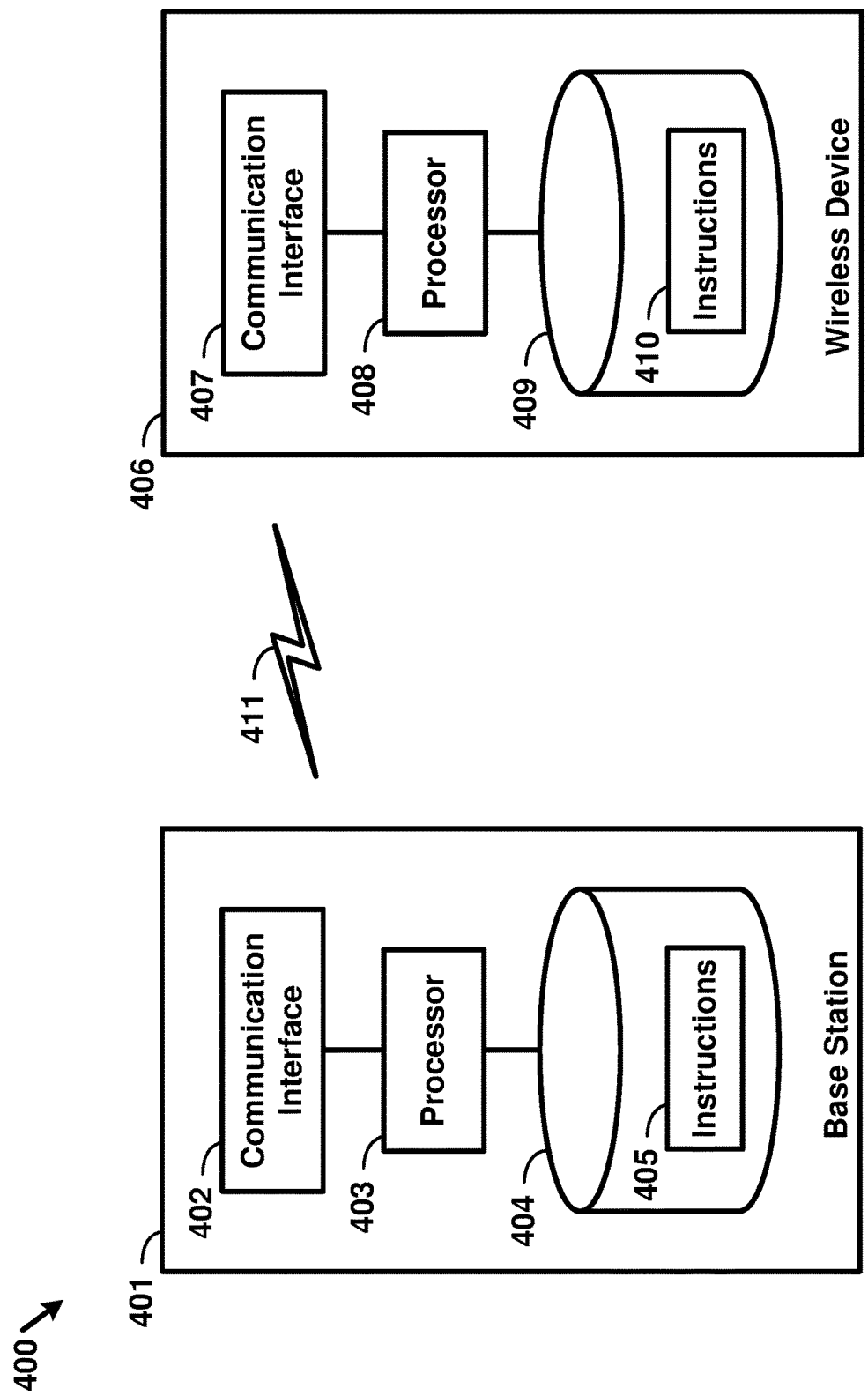
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
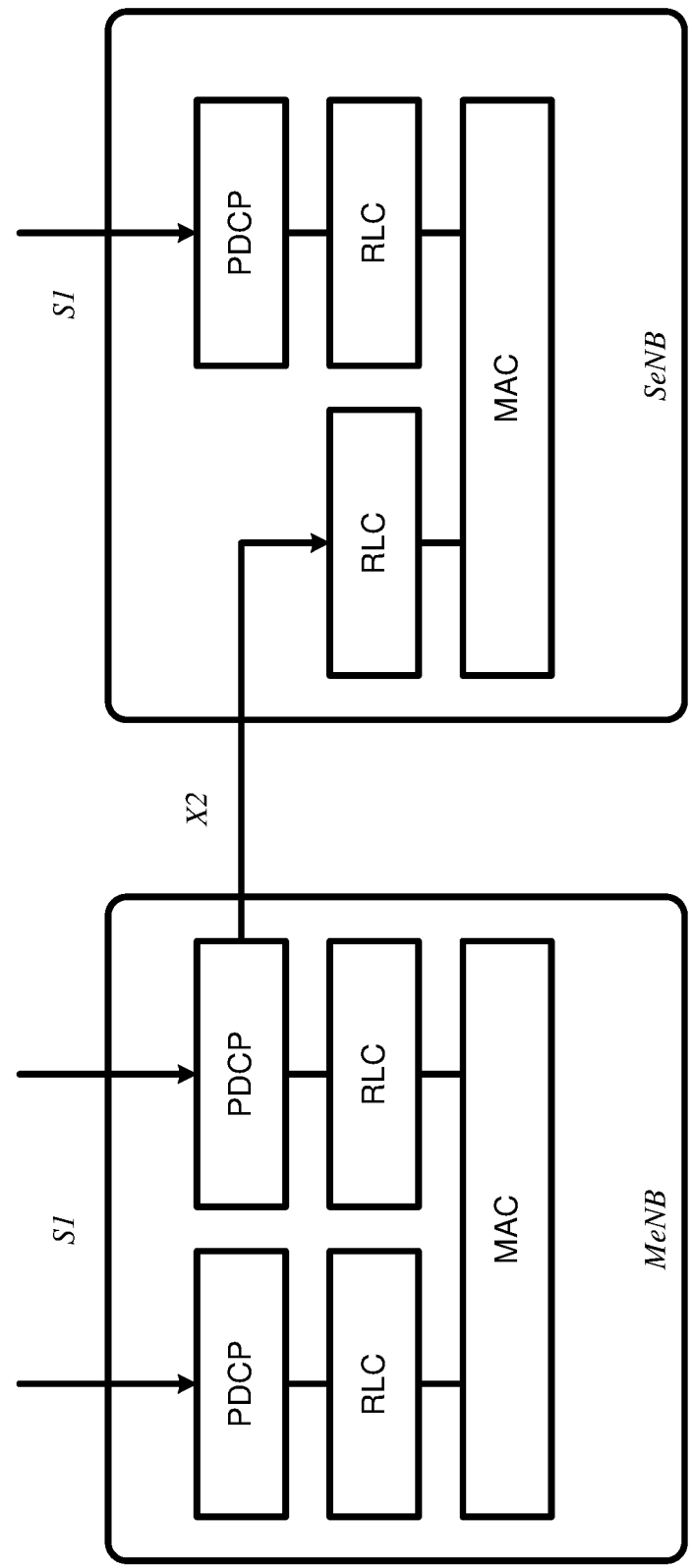
FIG. 6 is an example diagram for a protocol structure with CA and DC as per an aspect of an embodiment of the present disclosure.
Figure 7:
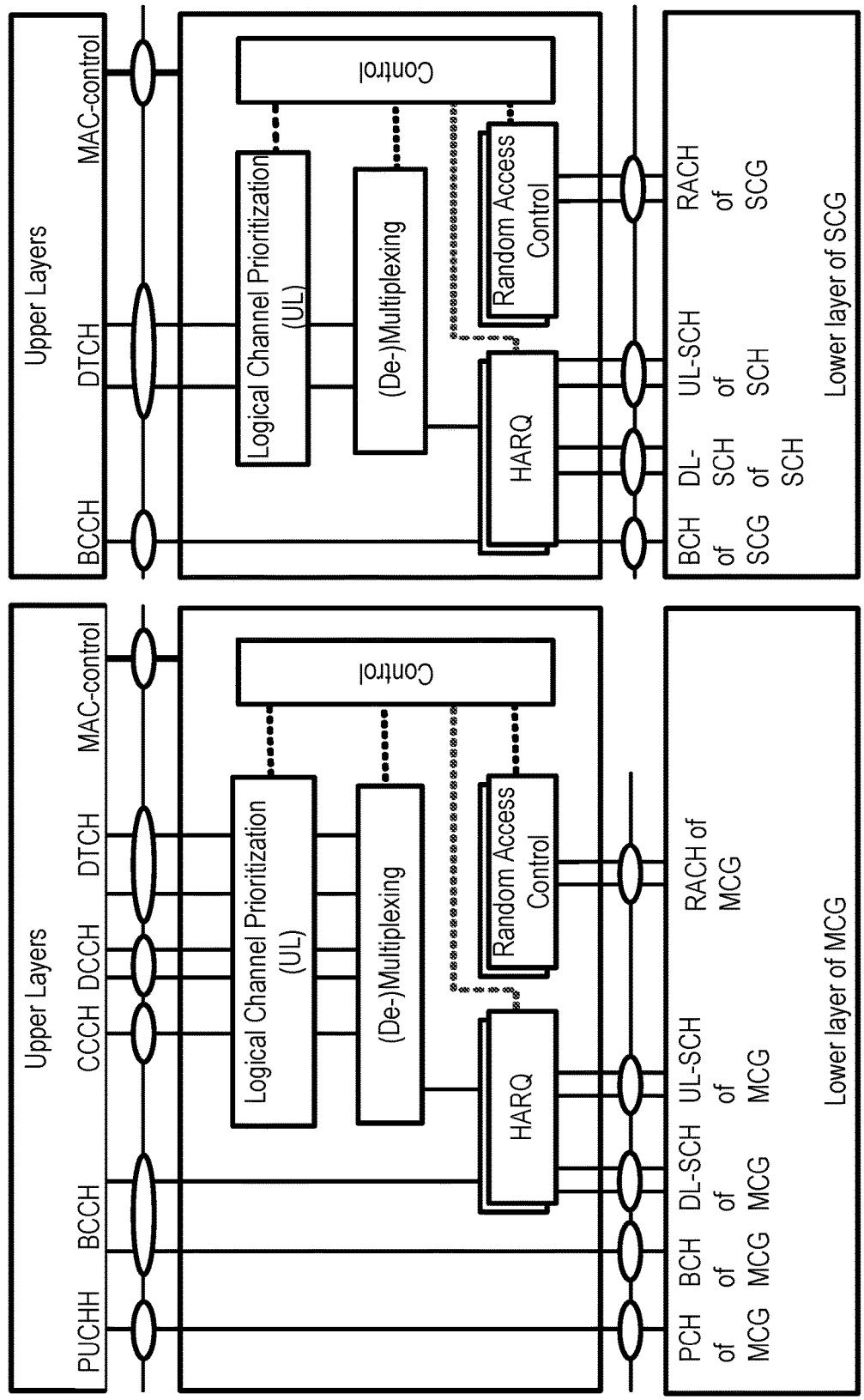
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
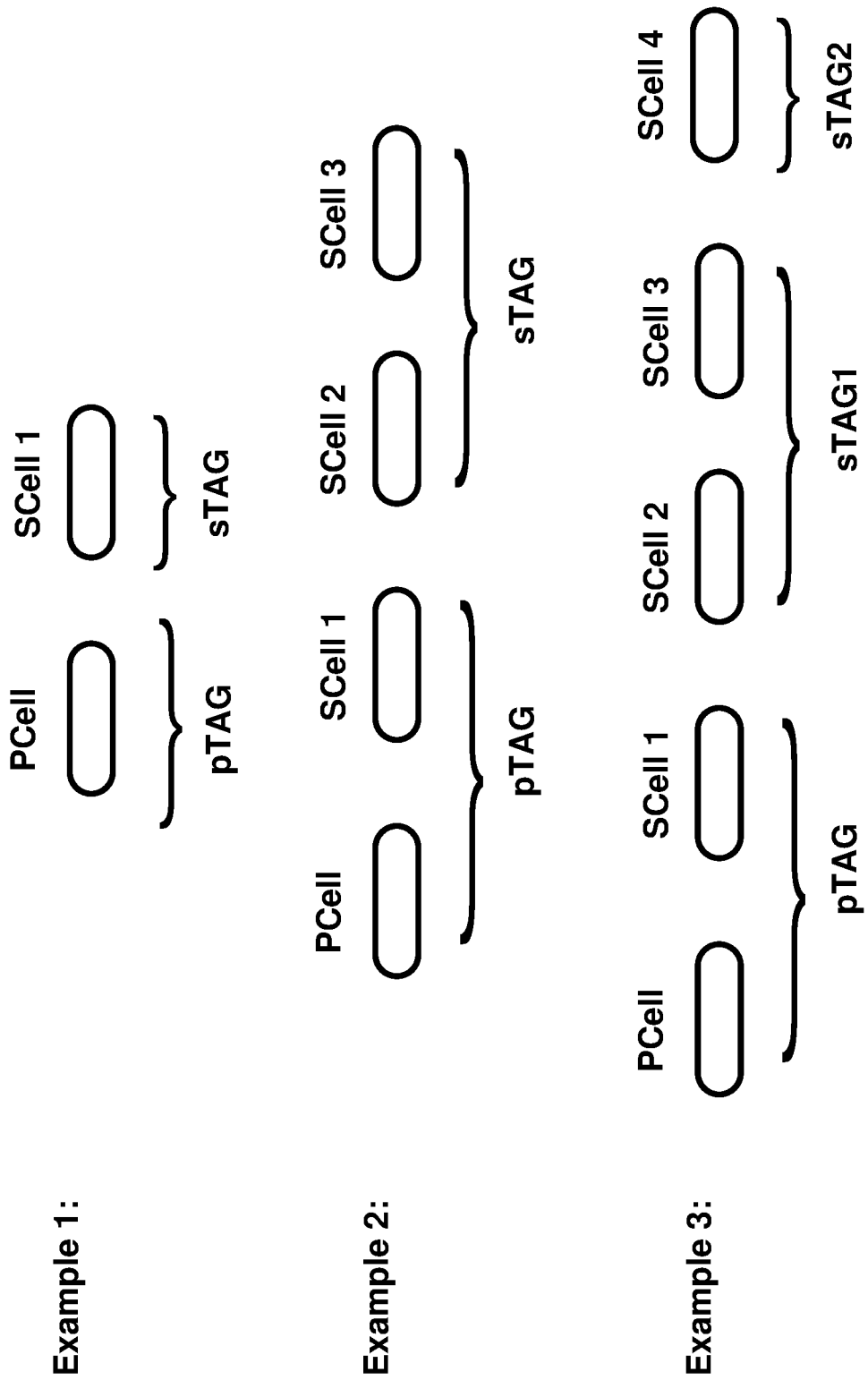
FIG. 8 shows example TAG configurations as per an aspect of an embodiment of the present disclosure.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
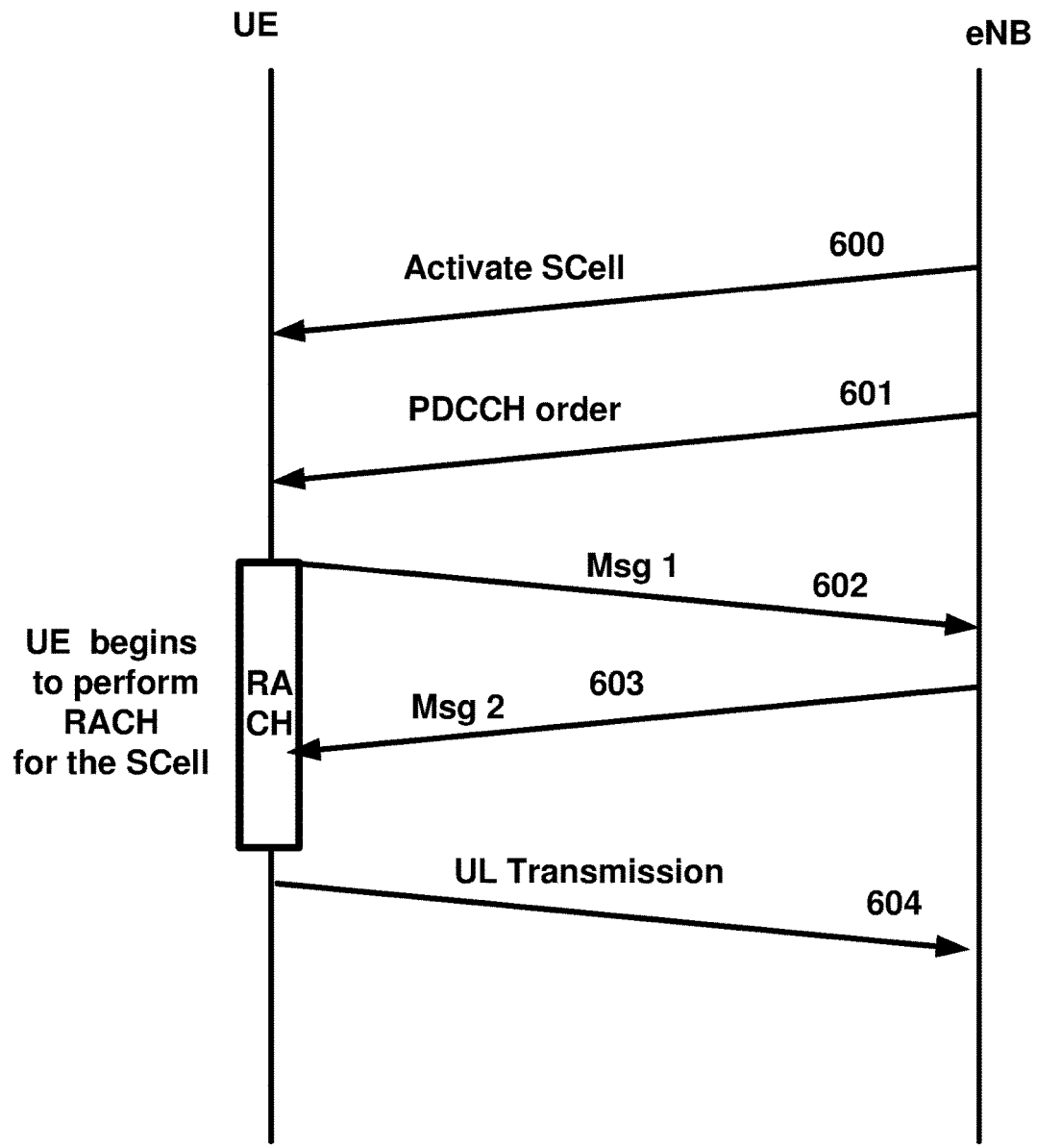
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/orif the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
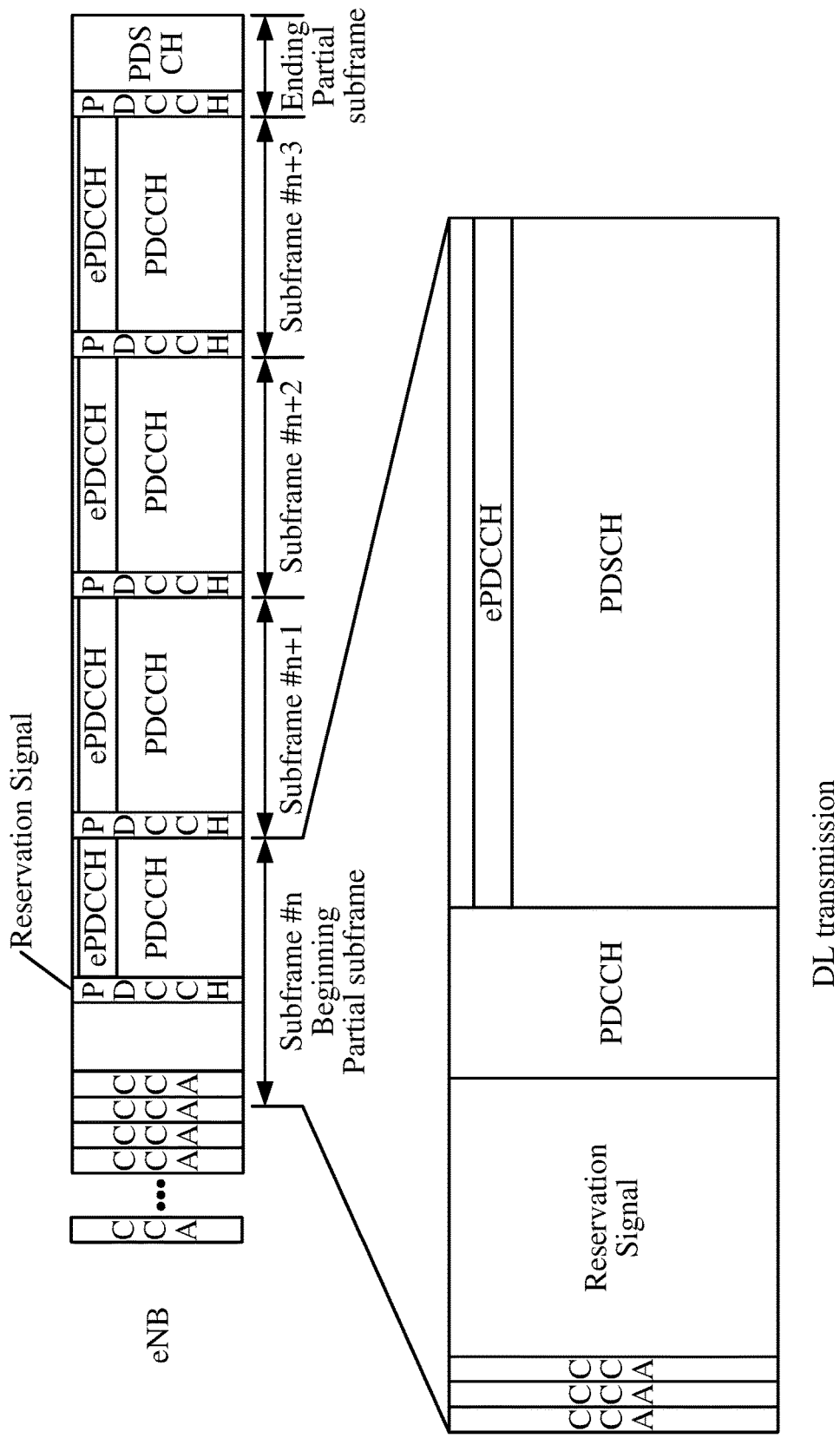
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one cell of a first type (e.g. license cell) and at least one cell of a second type (e.g. unlicensed cell, an LAA cell). The configuration parameters of a cell may, for example, comprise configuration parameters for physical channels, (for example, a ePDCCH, PDSCH, PUSCH, PUCCH and/or the like). The wireless device may determine transmission powers for one or more uplink channels. The wireless device may transmit uplink signals via at least one uplink channel based on the determined transmission powers.

In an example embodiments, LTE transmission time may include frames, and a frame may include many subframes. The size of various time domain fields in the time domain may be expressed as a number of time units $T_s=1/(15000 \times 2048)$ seconds. Downlink, uplink and sidelink transmissions may be organized into radio frames with $T_f=307200 \times T_s=10$ ms duration. In an example LTE implementation, at least three radio frame structures may be supported: Type 1, applicable to FDD, Type 2, applicable to TDD, Type 3, applicable to LAA secondary cell operation. LAA secondary cell operation applies to frame structure type 3.

Transmissions in multiple cells may be aggregated where one or more secondary cells may be used in addition to the primary cell. In case of multi-cell aggregation, different frame structures may be used in the different serving cells.

Frame structure type 1 may be applicable to both full duplex and half duplex FDD. A radio frame is $T_f=307200T_s=10$ ms long and may comprise 20 slots of length $T_{slot}=15360 \, T_s=0.5$ ms, numbered from 0 to 19. A subframe may include two consecutive slots where subframe i comprises of slots 2i and 2i+1.

For FDD, 10 subframes are available for downlink transmission and 10 subframes are available for uplink transmissions in a 10 ms interval. Uplink and downlink transmissions are separated in the frequency domain. In half-duplex FDD operation, the UE may not transmit and receive at the same time while there may not be such restrictions in full-duplex FDD.

Frame structure type 2 may be applicable to TDD. A radio frame of length $T_f=307200 \, T_s=10$ ms may comprise of two half-frames of length 153600 $T_s=5$ ms. A half-frame may comprise five subframes of length 30720 $T_s=1$ ms. A subframe i may comprise two slots, 2i and 2i+1, of length $T_{slot}=15360 \, T_s=0.5$ ms.

The uplink-downlink configuration in a cell may vary between frames and controls in which subframes uplink or downlink transmissions may take place in the current frame. The uplink-downlink configuration in the current frame is obtained via control signaling.

An example subframe in a radio frame, "may be a downlink subframe reserved for downlink transmissions, may be an uplink subframe reserved for uplink transmissions or may be a special subframe with the three fields DwPTS, GP and UpPTS. The length of DwPTS and UpPTS are subject to the total length of DwPTS, GP and UpPTS being equal to 30720 $T_s=1$ ms.

Uplink-downlink configurations with both 5 ms and 10 ms downlink-to-uplink switch-point periodicity may be supported. In case of 5 ms downlink-to-uplink switch-point periodicity, the special subframe may exist in both halfframes. In case of 10 ms downlink-to-uplink switch-point periodicity, the special subframe may exist in the first half-frame.

Subframes 0 and 5 and DwPTS may be reserved for downlink transmission. UpPTS and the subframe immediately following the special subframe may be reserved for uplink transmission.

In an example, in case multiple cells are aggregated, the UE may assume that the guard period of the special subframe in the cells using frame structure Type 2 have an overlap of at least $1456 \cdot T_s$.

In an example, in case multiple cells with different uplink-downlink configurations in the current radio frame are aggregated and the UE is not capable of simultaneous reception and transmission in the aggregated cells, the following constraints may apply. if the subframe in the primary cell is a downlink subframe, the UE may not transmit any signal or channel on a secondary cell in the same subframe. If the subframe in the primary cell is an uplink subframe, the UE may not be expected to receive any downlink transmissions on a secondary cell in the same subframe. If the subframe in the primary cell is a special subframe and the same subframe in a secondary cell is a downlink subframe, the UE may not be expected to receive PDSCH/EPDCCH/PMCH/PRS transmissions in the secondary cell in the same subframe, and the UE may not be expected to receive any other signals on the secondary cell in OFDM symbols that overlaps with the guard period or UpPTS in the primary cell.

Frame structure type 3 may be applicable to LAA secondary cell operation with normal cyclic prefix. A radio frame is $T_f=307200 \, T_s=10$ ms long and comprises of 20 slots of length $T_{slot}=15360 \, T_s=0.5$ ms, numbered from 0 to 19. A subframe may comprise as two consecutive slots where subframe i comprises slots 2i and 2i+1.

The 10 subframes within a radio frame are available for downlink transmissions. Downlink transmissions occupy one or more consecutive subframes, starting anywhere within a subframe and ending with the last subframe either fully occupied or following one of the DwPTS durations. Subframes may be available for uplink transmission when LAA uplink is supported.

Figure 12:
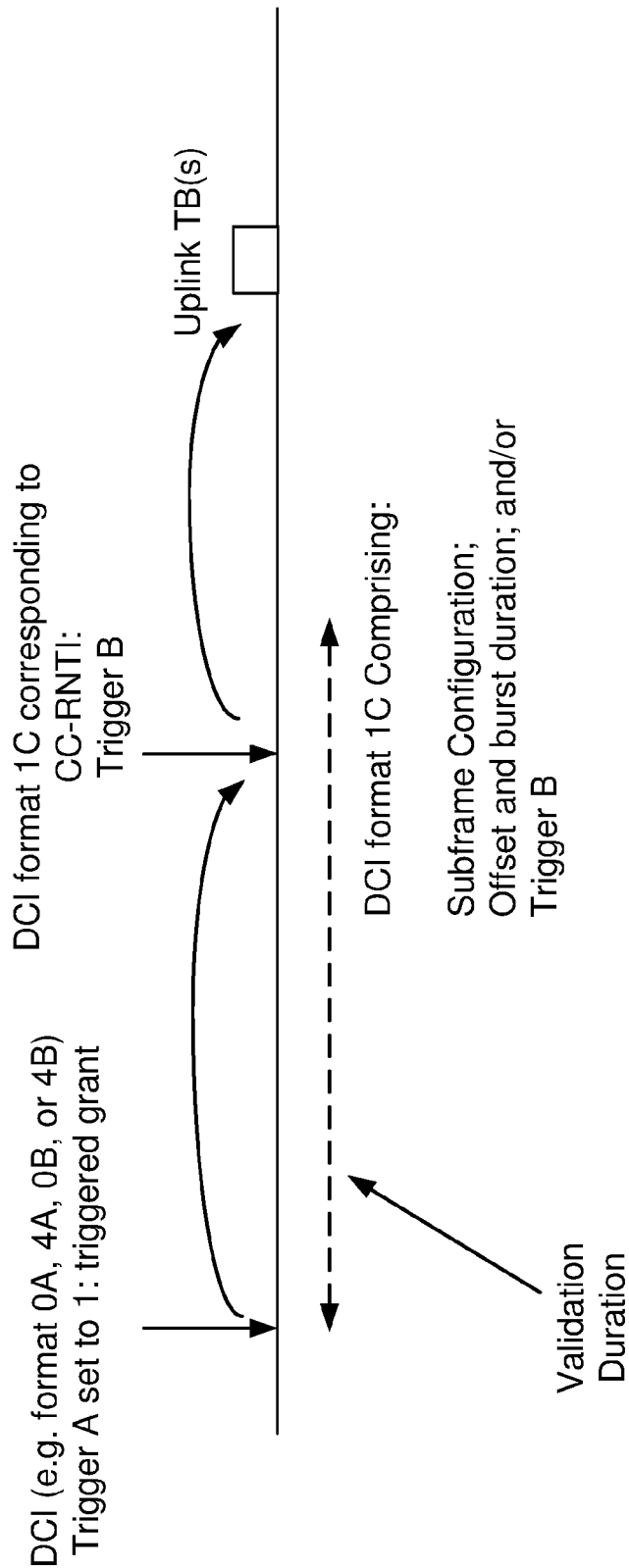
FIG. 12 is an example diagram depicting trigger A and trigger B in a 2-stage triggered grant as per an aspect of an embodiment of the present disclosure.

FIG. 12 shows an example 2-stage triggered grant with trigger A and trigger B. In an example embodiment, DCI 0A/4A/0B/4B may include a bit to indicate whether an UL grant is a triggered grant or not. If it is a triggered grant, the UE may transmit after receiving a trigger (e.g. one bit set to 1) in the PDCCH DCI scrambled with CC-RNTI in a subframe received after the subframe carrying the trigger. The timing between the 2nd trigger transmitted in subframe N and an earliest UL transmission may be a UE capability, if the earliest UL transmission is before subframe N+4 (e.g. UE capability signaling between transmission in subframe N+1 and N+2 and N+3). DCI 0A/4A/0B/4B may comprise one or more fields indicating resource block assignment, modulation and coding scheme, RV, HARQ information, transmit power control command, trigger A, and/or other physical layer parameters. The trigger may be received during a validation duration. The validation duration may be determined based on a field in the DCI including the uplink grant. The UE may monitor CC-RNTI for a trigger during the validation duration at least until the trigger is received.

DCI format 1C is used for example for LAA common information. The DCI format 1C in an LAA cell may comprise subframe configuration for an LAA cell—j bits (e.g., j=4) indicating a number of symbols. DCI format 1C may further comprise other information. DCI format 1C may further comprise, for example, k-bits (e.g. k=5) to indicate combinations of offset and burst duration. In an example, a code points may include {offset, duration} combinations as follows: combinations of {{1, 2, 3, 4, 6}, {1, 2, 3, 4, 5, 6}}, Reserved, no signalling of burst and offset. The format of the bits may be defined according to a pre-defined table. DCI format 1C may further comprise PUSCH trigger field (e.g. 1 bit) to indicate a trigger for a two-stage grant. For example, value 1 may indicate a trigger B and value 0 may indicate no trigger B. Reserved information bits may be added until the size is equal to that of format 1C used for very compact scheduling of one PDSCH code-word.

In an example, if a serving cell is an LAA Scell, the UE may receive PDCCH with DCI CRC scrambled by CC-RNTI on the LAA SCell. In an example, the DCI CRC scrambled by CC-RNTI may be transmitted in the common search space of an LAA cell. Example PDCCH procedures are described here.

In an example, a control region of a serving cell may comprise of a set of CCEs, numbered from 0 to $N_{CCE,k}-1$ according, where $N_{CCE,k}$ may be the total number of CCEs in the control region of subframe k. The UE may monitor a set of PDCCH candidates on one or more activated serving cells as configured by higher layer signalling for control information, where monitoring implies attempting to decode the PDCCHs in the set according to monitored DCI formats. A BL/CE UE may not be required to monitor PDCCH.

In an example, the set of PDCCH candidates to monitor are defined in terms of search spaces, where a search space $S_k^{(L)}$ at aggregation level $L \in \{1,2,4,8\}$ is defined by a set of PDCCH candidates. For a serving cell on which PDCCH is monitored, the CCEs corresponding to PDCCH candidate m of the search space $S_k^{(L)}$ are given by $L\{(Y_k+m') \mod \lfloor N_{CCE,k}/L \rfloor\}+i$, where $Y_k$ is defined below, i=0, ..., L-1. For the common search space m'=m. For the PDCCH UE specific search space, for the serving cell on which PDCCH is monitored, if the monitoring UE is configured with carrier indicator field then $m'=m+M^{(L)} \cdot n_{CI}$ where $n_{CI}$ is the carrier indicator field value, else if the monitoring UE is not configured with carrier indicator field then m'=m, where m=0, ..., $M^{(L)}-1$. $M^{(L)}$ is the number of PDCCH candidates to monitor in the given search space.

In an example, if a UE is configured with higher layer parameter cif-InSchedulingCell, the carrier indicator field value corresponds to cif-InSchedulingCell, otherwise, the carrier indicator field value is the same as ServCellIndex. The UE may monitor one common search space in a non-DRX subframe at aggregation levels 4 and 8 on the primary cell. A UE may monitor common search space on a cell to decode the PDCCHs necessary to receive MBMS on that cell when configured by higher layers.

In an example, if a UE is not configured for EPDCCH monitoring, and if the UE is not configured with a carrier indicator field, then the UE may monitor one PDCCH UE-specific search space at aggregation levels 1, 2, 4, 8 on an activated serving cell in every non-DRX subframe. If a UE is not configured for EPDCCH monitoring, and if the UE is configured with a carrier indicator field, then the UE may monitor one or more UE-specific search spaces at aggregation levels 1, 2, 4, 8 on one or more activated serving cells as configured by higher layer signalling in every non-DRX subframe.

In an example, if a UE is configured for EPDCCH monitoring on a serving cell, and if that serving cell is activated, and if the UE is not configured with a carrier indicator field, then the UE may monitor one PDCCH UE-specific search space at aggregation levels 1, 2, 4, 8 on that serving cell in non-DRX subframes where EPDCCH is not monitored on that serving cell. If a UE is configured for EPDCCH monitoring on a serving cell, and if that serving cell is activated, and if the UE is configured with a carrier indicator field, then the UE may monitor one or more PDCCH UE-specific search spaces at aggregation levels 1, 2, 4, 8 on that serving cell as configured by higher layer signalling in non-DRX subframes where EPDCCH is not monitored on that serving cell. The common and PDCCH UE-specific search spaces on the primary cell may overlap.

In an example, a UE configured with a carrier indicator field associated with monitoring PDCCH on serving cell c may monitor PDCCH configured with carrier indicator field and with CRC scrambled by C-RNTI in the PDCCH UE specific search space of serving cell c. A UE configured with the carrier indicator field associated with monitoring PDCCH on the primary cell may monitor PDCCH configured with carrier indicator field and with CRC scrambled by SPS C-RNTI in the PDCCH UE specific search space of the primary cell. The UE may monitor the common search space for PDCCH without carrier indicator field.

In an example, for the serving cell on which PDCCH is monitored, if the UE is not configured with a carrier indicator field, it may monitor the PDCCH UE specific search space for PDCCH without carrier indicator field, if the UE is configured with a carrier indicator field it may monitor the PDCCH UE specific search space for PDCCH with carrier indicator field. If the UE is not configured with a LAA Scell, the UE is not expected to monitor the PDCCH of a secondary cell if it is configured to monitor PDCCH with carrier indicator field corresponding to that secondary cell in another serving cell.

In an example, if the UE is configured with a LAA Scell, the UE is not expected to monitor the PDCCH UE specific space of the LAA SCell if it is configured to monitor PDCCH with carrier indicator field corresponding to that LAA Scell in another serving cell, where the UE is not expected to be configured to monitor PDCCH with carrier indicator field in an LAA Scell; and where the UE is not expected to be scheduled with PDSCH starting in the second slot in a subframe in an LAA Scell if the UE is configured to monitor PDCCH with carrier indicator field corresponding to that LAA Scell in another serving cell.

In an example, for the serving cell on which PDCCH is monitored, the UE may monitor PDCCH candidates at least for the same serving cell. A UE configured to monitor PDCCH candidates with CRC scrambled by C-RNTI or SPS C-RNTI with a common payload size and with the same first CCE index $n_{CCE}$ but with different sets of DCI information fields in the common search space and/or PDCCH UE specific search space.

In an example, a UE configured to monitor PDCCH candidates in a given serving cell with a given DCI format size with CIF, and CRC scrambled by C-RNTI, where the PDCCH candidates may have one or more possible values of CIF for the given DCI format size, may assume that a PDCCH candidate with the given DCI format size may be transmitted in the given serving cell in any PDCCH UE specific search space corresponding to any of the possible values of CIF for the given DCI format size.

In an example, if a serving cell is an LAA Scell, the UE may receive PDCCH with DCI CRC scrambled by CC-RNTI on the LAA Scell. The DCI formats that the UE may monitor depend on the configured transmission mode of a serving cell.

Example subframe configuration for Frame Structure Type 3 are described here. If a UE detects PDCCH with DCI CRC scrambled by CC-RNTI in subframe n−1 or subframe n of a LAA Scell, the UE may assume the configuration of occupied OFDM symbols in subframe n of the LAA Scell according to the Subframe configuration for LAA field in the detected DCI in subframe n−1 or subframe n.

In an example, the Subframe configuration for LAA field indicates the configuration of occupied OFDM symbols (e.g., OFDM symbols used for transmission of downlink physical channels and/or physical signals) in current and/or next subframe according to a predefined table. If the configuration of occupied OFDM symbols for subframe n is indicated by the Subframe configuration for LAA field in both subframe n−1 and subframe n, the UE may assume that the same configuration of occupied OFDM symbols is indicated in both subframe n−1 and subframe n.

In an example, if a UE detects PDCCH with DCI CRC scrambled by CC-RNTI in subframe n, and the UE does not detect PDCCH with DCI CRC scrambled by CC-RNTI in subframe n−1, and if the number of occupied OFDM symbols for subframe n indicated by the Subframe configuration for LAA field in subframe n is less than 14, the UE is not required to receive any other physical channels in subframe n.

In an example, if a UE does not detect PDCCH with DCI CRC scrambled by CC-RNTI containing Subframe Configuration for LAA field set to other than '1110' and '1111' in subframe n and the UE does not detect PDCCH with DCI CRC scrambled by CC-RNTI containing Subframe Configuration for LAA field set to other than '1110' and '1111' in subframe n−1, the UE is not required to use subframe n for updating CSI measurement.

In an example, the UE may detect PDCCH with DCI CRC scrambled by CC-RNTI by monitoring the following PDCCH candidates according to DCI Format 1C: one PDCCH candidate at aggregation level L=4 with the CCEs corresponding to the PDCCH candidate given by CCEs numbered 0,1,2,3; one PDCCH candidate at aggregation level L=8 with the CCEs corresponding to the PDCCH candidate given by CCEs numbered 0,1,2,3,4,5,6,7.

In an example, if a serving cell is an LAA Scell, and if the higher layer parameter subframeStartPosition for the Scell indicates 's07', and if the UE detects PDCCH/EPDCCH intended for the UE starting in the second slot of a subframe, the UE may assume that OFDM symbols in the first slot of the subframe are not occupied, and OFDM symbols in the second slot of the subframe are occupied. If subframe n is a subframe in which OFDM symbols in the first slot are not occupied, the UE may assume that the OFDM symbols are occupied in subframe n+1.

In an example embodiment, a field in DCI format 0A/4A/0B/4B for the triggered grant, e.g. 4-bit SF timing, may be reused to signal to the UE a subframe for transmission after reception of the trigger. When a UE receives a trigger in subframe N, the UE may be allowed to start transmission in subframe N+X+Y. 2 bits are reused to indicate X. X={0,1,2,3} may be indicated to the UE reusing two bits in the DCI. Y may be given by the UL burst offset in the C-PDCCH DCI scrambled by CC-RNTI (e.g. in the same subframe where the trigger is transmitted). The UE may receive signalling in the first DCI 0A/4A/0B/4B grant indicating the number of subframes after which the grant becomes invalid. The initial grant may become invalid if M ms after the initial grant, no valid trigger has been received, e.g. M={8,12,16,20}. In an example, a UE may follow the LBT type indicated by the UL grant.

In an example embodiment, C(common)-PDCCH may indicate a pair of values (UL burst duration, offset). UL burst duration may be a number of consecutive UL subframes belonging to the same channel occupancy. Offset may be the number of subframes to the start of indicated UL burst from the start of the subframe carrying the C-PDCCH.

In an example embodiment, an LBT procedure may be switched to an LBT based on 25 us CCA for any UL subframe from the subframe in which C-PDCCH was received up to and including subframes until the end of the signalled UL burst duration, for which the eNB had already indicated to perform Category 4 LBT. In an example, a UE may not switch to 25 us CCA if part of a set of contiguously scheduled subframes without gap appears in the UL burst indication. The UE may not be required to receive any DL signals/channels in a subframe indicated to be a UL subframe on the carrier. In an example, 5 bits may be employed to indicate combinations of offset and burst duration. Example code points include {offset, duration} combinations as follows: combinations of {{1, 2, 3, 4, 6}, {1, 2, 3, 4, 5, 6}}, Reserved, no signalling of burst and offset. The format of the bits may be defined according to a pre-defined table.

In an example embodiment, resource block assignment field in DCI 0A/4A/0B/4B may be 6 bits. In an example, the 64 code points indicated by the 6 bits may include the legacy RIV for contiguous interlace allocation except the code points for the allocation of 7 contiguous interlaces (70 PRBs). This set of code points may include 51 values. Additional code points may be defined for allocation of interlaces as follows: 0, 1, 5, 6; 2, 3, 4, 7, 8, 9; 0, 5; 1, 6; 2, 7; 3, 8; 4, 9; 1, 2, 3, 4, 6, 7, 8, 9. Remaining code points may be reserved.

In an example, the Activation/Deactivation MAC control element of one octet may be identified by a MAC PDU subheader with LCID 11000. FIG. 11 shows example Activation/Deactivation MAC control elements. The Activation/Deactivation MAC control element may have a fixed size and may comprise of a single octet containing seven C-fields and one R-field. Example Activation/Deactivation MAC control element with one octet is shown in FIG. 11. The Activation/Deactivation MAC control element may have a fixed size and may comprise of four octets containing 31 C-fields and one R-field. Example Activation/Deactivation MAC control element of four octets is shown in FIG. 11. In an example, for the case with no serving cell with a serving cell index (ServCellIndex) larger than 7, Activation/Deactivation MAC control element of one octet may be applied, otherwise Activation/Deactivation MAC control element of four octets may be applied. The fields in an Activation/Deactivation MAC control element may be interpreted as follows. $C_i$: if there is an SCell configured with SCellIndex i, this field may indicate the activation/deactivation status of the SCell with SCellIndex i, else the MAC entity may ignore the Ci field. The Ci field may be set to "1" to indicate that the SCell with SCellIndex i is activated. The Ci field is set to "0" to indicate that the SCell with SCellIndex i is deactivated. R: Reserved bit, set to "0".

In an example, if the MAC entity is configured with one or more SCells, the network may activate and deactivate the configured SCells. The SpCell may remain activated. The network may activate and deactivate the SCell(s) by sending the Activation/Deactivation MAC control element. In example, the MAC entity may maintain a sCellDeactivationTimer timer for a configured SCell. sCellDeactivationTimer may be disabled for the SCell configured with PUCCH, if any. In example, the MAC entity may deactivate the associated SCell upon its expiry. In an example, the same initial timer value may apply to each instance of the sCellDeactivationTimer and it is configured by RRC. The configured SCells may be initially deactivated upon addition and after a handover. The configured SCG SCells are initially deactivated after a SCG change.

The MAC entity may for each TTI and for a configured SCell perform the following: if the MAC entity receives an Activation/Deactivation MAC control element in this TTI activating the SCell, the MAC entity may in the TTI according to a predefined timing, activate the SCell. A UE may operate the following for an activated SCell including: SRS transmissions on the SCell; CQI/PMI/RI/PTI/CRI reporting for the SCell; PDCCH monitoring on the SCell; PDCCH monitoring for the SCell; PUCCH transmissions on the SCell, if configured.

If the MAC entity receives an Activation/Deactivation MAC control element in this TTI activating the SCell, the UE may start or restart the sCellDeactivationTimer associated with the SCell and may trigger PHR. If the MAC entity receives an Activation/Deactivation MAC control element in this TTI deactivating the SCell or if the sCellDeactivationTimer associated with the activated SCell expires in this TTI, in the TTI according to a predefined timing, the UE may deactivate the SCell; stop the sCellDeactivationTimer associated with the SCell; flush HARQ buffers associated with the SCell.

In an example embodiment, if the SCell is deactivated: the UE may not transmit SRS on the SCell; not report CQI/PMI/RI/PTI/CRI for the SCell; not transmit on UL-SCH on the SCell; not transmit on RACH on the SCell; not monitor the PDCCH on the SCell; not monitor the PDCCH for the Cell; and/or not transmit PUCCH on the SCell. When SCell is deactivated, the ongoing random access procedure on the SCell, if any, is aborted.

In an example embodiment, the sCellDeactivationTimer for a cell may be disabled and there may be no need to manage sCellDeactivationTimer for the cell and the cell may be activated or deactivated employing A/D MAC CE.

In an example, when a single stage grant is configured, if PDCCH on the activated SCell indicates an uplink grant or downlink assignment; or if PDCCH on the Serving Cell scheduling the activated SCell indicates an uplink grant or a downlink assignment for the activated SCell: the UE/eNB may restart the sCellDeactivationTimer associated with the SCell.

In an example embodiment, an eNB may transmit one or more RRC messages comprising one or more parameters (IEs). The one or more parameters may comprise configuration parameters of one or more licensed cells and one or more unlicensed cells (e.g. LAA cells). The one or more parameters may comprise a sCellDeactivationTimer value.

For example, sCellDeactivationTimer ENUMERATED {rf2, rf4, rf8, rf16, rf32, rf64, rf128, spare} OPTIONAL. SCell deactivation timer value may be in number of radio frames. For example, value rf4 corresponds to 4 radio frames, value rf8 corresponds to 8 radio frames and so on. In an example, E-UTRAN may configure the field if the UE is configured with one or more SCells other than the PSCell and PUCCH SCell. If the field is absent, the UE may delete any existing value for this field and assume the value to be set to infinity. In an example, the same value may apply for each SCell of a Cell Group (e.g. MCG or SCG) (the associated functionality is performed independently for each SCell). Field sCellDeactivationTimer may not apply to an SCell, when the for the sCellDeactivationTimer is disabled for the SCell (e.g. PUCCH SCell and/or other SCells).

A UE may Support UL/DL Scheduling Combinations: Self-scheduling on DL and cross-carrier scheduling on UL. The UE to monitor for DCI formats scheduling PUSCH of a single eLAA Scell on one UL licensed-band scheduling cell, e.g. DCI formats 0A/0B, Formats 4A/4B (e.g if configured for TM2). The UE may monitor for DCI formats scheduling LAA PDSCH on the LAA SCell, e.g. DCI formats 1A/1B/1D/1/2A/2/2B/2C/2D. In legacy RRC mechanisms, when cross carrier scheduling is configured by RRC for an SCell, the scheduling cell schedules both downlink and uplink (if configured) grants for the scheduled cell. In an example, the RRC signaling and cross carrier scheduling may be enhanced. RRC signaling may configure self-scheduling for DL and cross-carrier scheduling for UL, for example for an LAA cell. For example, a new parameter in the cross-carrier scheduling configuration parameters may indicate whether the cross-carrier scheduling is for both downlink scheduling and uplink scheduling or is for uplink scheduling (and DL is self-scheduled). In an example, a licensed cell may be configured for cross-carrier scheduling an unlicensed (e.g. LAA) cell.

The IE CrossCarrierSchedulingConfig may used to specify the configuration when the cross carrier scheduling is used in a cell. In an example, the IE CrossCarrierScheduling Config may comprise cif-Presence, schedulingCellId, and pdsch-Start. In an example, the IE CrossCarrierSchedulingConfig may comprise cif-Presence, schedulingCellId, pdsch-Start, and cif-InSchedulingCell. In an example, cif-Presence may be used to indicate whether carrier indicator field is present (value true) or not (value false) in PDCCH/EPDCCH DCI formats. In an example, pdsch-Start field may indicate the starting OFDM symbol of PDSCH for the concerned SCell. In an example, values 1, 2, 3 are applicable when dl-Bandwidth for the concerned SCell is greater than 10 resource blocks, values 2, 3, 4 are applicable when dl-Bandwidth for the concerned SCell is less than or equal to 10 resource blocks. In an example, cif-InSchedulingCell field may indicate the CIF value used in the scheduling cell to indicate this cell. In an example, schedulingCellId field may indicates which cell signals the downlink allocations and/or uplink grants, if applicable, for the concerned SCell. In case the UE is configured with DC, the scheduling cell is part of the same cell group (e.g. MCG or SCG) as the scheduled. In an example, an IE in IE CrossCarrierSchedulingConfig of an RRC message may indicate self-scheduling on DL and cross-carrier scheduling on UL (for example for an LAA cell). In an example, an IE in IE CrossCarrierSchedulingConfig of an RRC message may indicate cross-carrier scheduling on both downlink and uplink.

There is an uplink HARQ entity at a MAC entity for a serving cell with configured uplink, which may maintain a number of parallel HARQ processes allowing transmissions to take place continuously while waiting for the HARQ feedback on the successful or unsuccessful reception of previous transmissions. In an example, when the physical layer is configured for uplink spatial multiplexing, there may be two HARQ processes associated with a given TTI. Otherwise there is one HARQ process associated with a given TTI. At a given TTI, if an uplink grant is indicated for the TTI, the HARQ entity identifies the HARQ process(es) for which a transmission may take place. It also routes the received HARQ feedback (ACK/NACK information), MCS and resource, relayed by the physical layer, to the appropriate HARQ process(es).

In an example, in asynchronous HARQ operation, a HARQ process may be associated with a TTI based on the received uplink DCI grant. Except for NB-IoT, an asynchronous HARQ process may be associated with a HARQ process identifier. For UL transmission with UL grant in RAR, HARQ process identifier 0 may be used. HARQ feedback may not be applicable for asynchronous UL HARQ.

In an example embodiment, when TTI bundling is configured, the parameter TTI_BUNDLE_SIZE may provide the number of TTIs of a TTI bundle. TTI bundling operation may rely on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e the TTI corresponding to TTI_BUNDLE_SIZE), regardless of whether a transmission in that TTI takes place or not (e.g. when a measurement gap occurs). A retransmission of a TTI bundle may be a TTI bundle. TTI bundling may not be supported when the MAC entity is configured with one or more SCells with configured uplink. In an example, uplink HARQ operation may be asynchronous for NB-IoT UEs, BL UEs or UEs in enhanced coverage except for the repetitions within a bundle.

In an example embodiment, for NB-IoT UEs, BL UEs or UEs in enhanced coverage, the parameter ul_repetition_number provides the number of transmission repetitions within a bundle. For a bundle, ul_repetition_number is set to a value provided by lower layers. Bundling operation may rely on the HARQ entity for invoking the same HARQ process for a transmission that is part of the same bundle. Within a bundle HARQ retransmissions may be non-adaptive and may be triggered without waiting for feedback from previous transmissions according to ul_repetition_number. An uplink grant corresponding to a new transmission or a retransmission of the bundle may be received after the last repetition of the bundle. A retransmission of a bundle may be a bundle. In an example, TTI bundling may not be supported for RN communication with the E-UTRAN in combination with an RN subframe configuration.

In an example, for transmission of Msg3 during Random Access TTI bundling may not apply. For NB-IoT UEs, BL UEs or UEs in enhanced coverage, uplink repetition bundling is used for transmission of Msg3. For a TTI, the HARQ entity may identify the HARQ process(es) associated with this TTI, and for an identified HARQ process. In an example, if an uplink grant has been indicated for this process and this TTI: perform process A, else perform process B.

In an example process A, if the received grant was not addressed to a Temporary C-RNTI on PDCCH and if the NDI provided in the associated HARQ information has been toggled compared to the value in the previous transmission of this HARQ process; or if the uplink grant was received on PDCCH for the C-RNTI and the HARQ buffer of the identified process is empty; or if the uplink grant was received in a Random Access Response: a) if there is a MAC PDU in the Msg3 buffer and the uplink grant was received in a Random Access Response: obtain the MAC PDU to transmit from the Msg3 buffer; else: obtain the MAC PDU to transmit from the "Multiplexing and assembly" entity; b) deliver the MAC PDU and the uplink grant and the HARQ information to the identified HARQ process; c) instruct the identified HARQ process to trigger a new transmission. Else: a) deliver the uplink grant and the HARQ information (redundancy version) to the identified HARQ process; b) instruct the identified HARQ process to generate an adaptive retransmission.

In an example process B, if the HARQ buffer of this HARQ process is not empty: instruct the identified HARQ process to generate a non-adaptive retransmission.

In an example, when determining if NDI has been toggled compared to the value in the previous transmission the MAC entity may ignore NDI received in uplink grants on PDCCH for its Temporary C-RNTI.

In an example embodiment, for a TTI, the HARQ entity may identify the HARQ process(es) associated with this TTI, and for an identified HARQ process: if an uplink grant has been indicated for this process and this TTI, and the uplink grant is for a new transmission, the MAC entity in the UE may obtain the MAC PDU to transmit from the Multiplexing and assembly entity; deliver the MAC PDU and the uplink grant and the HARQ information to the identified HARQ process; and instruct the identified HARQ process to trigger a new transmission. If the uplink grant is for a retransmission, the MAC entity in the UE may deliver the uplink grant and the HARQ information (redundancy version) to the identified HARQ process; and instruct the identified HARQ process to generate an adaptive retransmission.

In an example, the Power Headroom reporting procedure may be used to provide the serving eNB with information about the difference between the nominal UE maximum transmit power and the estimated power for UL-SCH transmission per activated serving cell and also with information about the difference between the nominal UE maximum power and the estimated power for UL-SCH and PUCCH transmission on SpCell and PUCCH SCell.

A base station may transmit one or more RRC messages comprising configuration parameters of a plurlaity of cells. The configuration parameters may comprise power headroom configuration parameters for configuring power headroom reporting. RRC may control power headroom reporting by configuring two timers periodicPHR-Timer and prohibitPHR-Timer, and by signalling dl-PathlossChange which sets the change in measured downlink pathloss and the required power backoff due to power management to trigger a PHR.

A Power Headroom Report (PHR) may be triggered if at least one of the following events occur: a) prohibitPHR-Timer expires or has expired and the path loss has changed more than dl-PathlossChange dB for at least one activated serving cell of any MAC entity which is used as a pathloss reference since the last transmission of a PHR in this MAC entity when the MAC entity has UL resources for new transmission; b) periodicPHR-Timer expires; c) upon configuration or reconfiguration of the power headroom reporting functionality by upper layers, which is not used to disable the function; d) activation of an SCell of any MAC entity with configured uplink; e) addition of the PSCell; f)

prohibitPHR-Timer expires or has expired, when the MAC entity has UL resources for new transmission, and the following is true in this TTI for any of the activated serving cells of any MAC entity with configured uplink: there are UL resources allocated for transmission or there is a PUCCH transmission on this cell, and the required power backoff due to power management for this cell has changed more than dl-PathlossChange dB since the last transmission of a PHR when the MAC entity had UL resources allocated for transmission or PUCCH transmission on this cell. In an example, a MAC entity may avoid triggering a PHR when the required power backoff due to power management decreases only temporarily (e.g. for up to a few tens of milliseconds) and it may avoid reflecting such temporary decrease in the values of PCMAX,c/PH when a PHR is triggered by other triggering conditions.

In an example embodiment, an uplink DCI grant may be a two-stage DCI grant. In a two-stage DCI grant, a timing of a trigger B and other parameters may determine the TTI for uplink transmissions. When two-stage DCI grants are implemented, the TTI of uplink transmissions corresponding to the uplink DCI grant is not known (at the time the DCI grant is received). In a two-stage DCI grant, if a trigger B is not received during a trigger validation duration after the two-stage DCI grant, the two-stage DCI grant may be invalidated. Current PHR process depends on the TTI that is employed for uplink TB transmission, which is not known to the UE at the time the DCI grant is received. If the current timing for calculating/determining PHR values, creating a MAC PDU including the PHR, and executing other PHR processes are implemented when two-stage grants are implemented, the PHR implementation results in uplink transmission issues and additional UE processing. Additionally, current PHR processes do not address a scenario when the two-stage DCI grant is invalidated (when the trigger B is not received during a trigger validation duration).

There is a need to provide an enhanced PHR process for uplink transmissions when two-stage uplink DCI grants are implemented in a wireless network. Example embodiments enhance calculation/determination of PHR values, generation of MAC PDU including a PHR, and PHR timer management when two stage grants are implemented. Example embodiments enhances PHR processes when two-stage grants are implemented.

In order to transmit on the UL-SCH, the MAC entity may have a valid uplink grant (except for non-adaptive HARQ retransmissions) which the UE may receive dynamically on the PDCCH or in a Random Access Response or which may be configured semi-persistently. To perform requested transmissions, the MAC layer may receive HARQ information from lower layers. In an example, when the physical layer is configured for uplink spatial multiplexing, the MAC layer may receive up to two grants (one per HARQ process) for the same TTI from lower layers.

In an example, two-stage DCI grants may be implemented. A wireless device may receive a first downlink control information (DCI) comprising: a first trigger field indicating that the first DCI is triggered in response to a second DCI indicating a second trigger (trigger B); and/or a field indicating a validation duration for receiving the second DCI via a cell. The first trigger field (trigger A field) may be set to 1 to indicate that the first DCI is a triggered DCI.

There is a need to develop MAC/PHY PHR processes when a two-stage DCI grant is implemented. In the current procedures, the DCI grant may be invalidated when trigger B is not received during a validation duration. The physical layer may monitor for trigger B. Uplink transmissions corresponding to the DCI grant are not performed if trigger B is not received. In an example embodiment of the invention, the UE may deliver the uplink DCI grant and the associated HARQ information to the HARQ entity for a TTI in response to receiving an uplink DCI grant regardless of whether the trigger B is received or not. In an example, the UE may deliver the uplink grant (e.g. as soon as it is available) and the associated HARQ information to the MAC entity for a TTI when a DCI grant is received even before a trigger B is received. This process provides additional flexibility and enables a UE MAC entity to start MAC PDU generation and processing before trigger B is received. A MAC entity may consider the transmission to have been performed anyway regardless of whether the trigger B is received or not.

In an example, if the MAC entity has a C-RNTI, a Semi-Persistent Scheduling C-RNTI, or a Temporary C-RNTI, the MAC entity may for a TTI and for a serving cell (e.g. belonging to a TAG that has a running timeAlignmentTimer), for a grant received for this TTI: if a first stage of a two-stage uplink DCI grant for a TTI and this serving cell has been received on the PDCCH for the MAC entity's C-RNTI (or Temporary C-RNTI), the UE may deliver the uplink DCI grant and the associated HARQ information to the HARQ entity for the TTI. This is done regardless of whether the trigger B is received or not.

In a two-stage grant, the TTI for transmission in the resources identified in the uplink DCI grant may depend on when a DCI including a trigger B is received in a common search space of the LAA cell. The UE may process the MAC PDU before receiving the trigger B. In some example scenarios, the TTI for transmission may be, e.g., one or two subframes after receiving the trigger, and depending on a UE capability, a UE may not have enough time to construct and process the MAC PDU after receiving the trigger. The UE may construct and process (e.g. multiplex and/or encode, etc) the MAC PDU before the trigger B is received. Upon receiving the trigger B the UE may perform some physical layer processing and map the TB on the physical resources. Depending on the content of the DCI grant (which may determine a minimum subframes between the trigger B and transmission TTI) and/or depending on a UE capability, a UE may be able to construct and process the MAC PDU before or after receiving a trigger B.

In an example embodiment, an uplink DCI grant may be a two-stage DCI grant. In a two-stage DCI grant, a timing of a trigger B and other parameters may determine the TTI for uplink transmission. When two-stage DCI grants are implemented, the TTI of uplink transmissions corresponding to the uplink DCI grant is not known (at the time the DCI grant is received). In a two-stage DCI grant, if the trigger B is not received during a trigger validation duration after the two-stage DCI grant, the two-stage DCI grant may be invalidated.

In an example, the UE may deliver the uplink grant (as soon as it is available) and the associated HARQ information to the MAC entity for a TTI when a DCI grant is received even before the trigger B is received. This provides additional flexibility and enables a UE/MAC entity to start generation of MAC PDU including a PHR before trigger B is received. A MAC entity may consider the transmission to have been performed anyway regardless of whether the trigger B is received or not. The UE may construct and process (e.g. multiplex and/or encode, etc) the MAC PDU comprising a PHR MAC CE before a corresponding trigger B is received.

In an example embodiment, if the MAC entity has UL resources allocated for new transmission for a TTI, the MAC entity may if the power headroom reporting procedure determines that at least one PHR has been triggered and not cancelled, and if the allocated UL resources can accommodate the MAC control element (plus its subheader) for PHR which the MAC entity is configured to transmit (as a result of logical channel prioritization), the MAC entity may obtain PHR values, instruct the multiplexing and assembly procedure to generate and transmit a PHR MAC control element, and start or restart prohibitPHR-Timer and may cancel triggered PHR(s).

Figure 13:
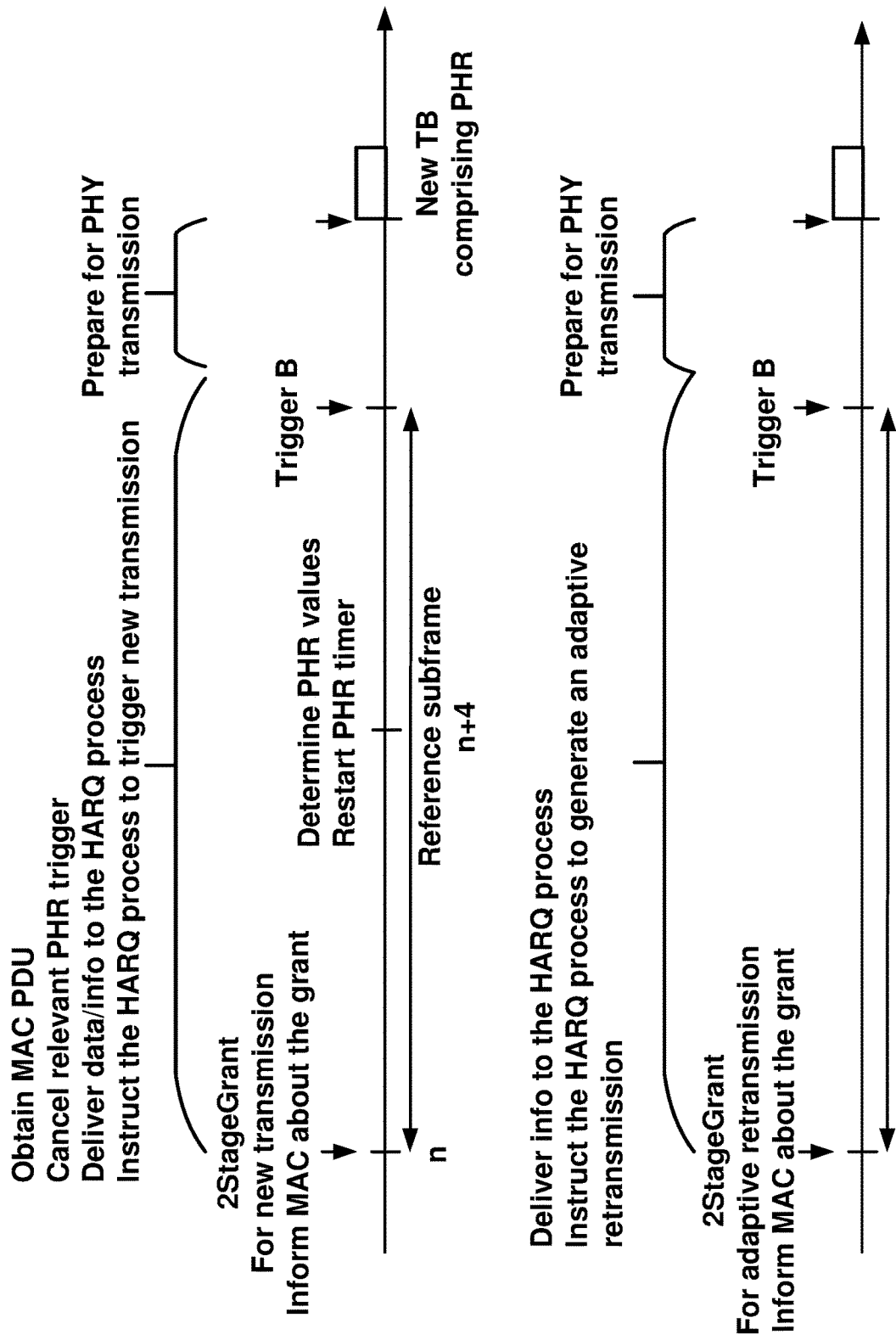
FIG. 13 is an example diagram depicting a PHR process for a two-stage grant as per an aspect of an embodiment of the present disclosure.
Figure 15:
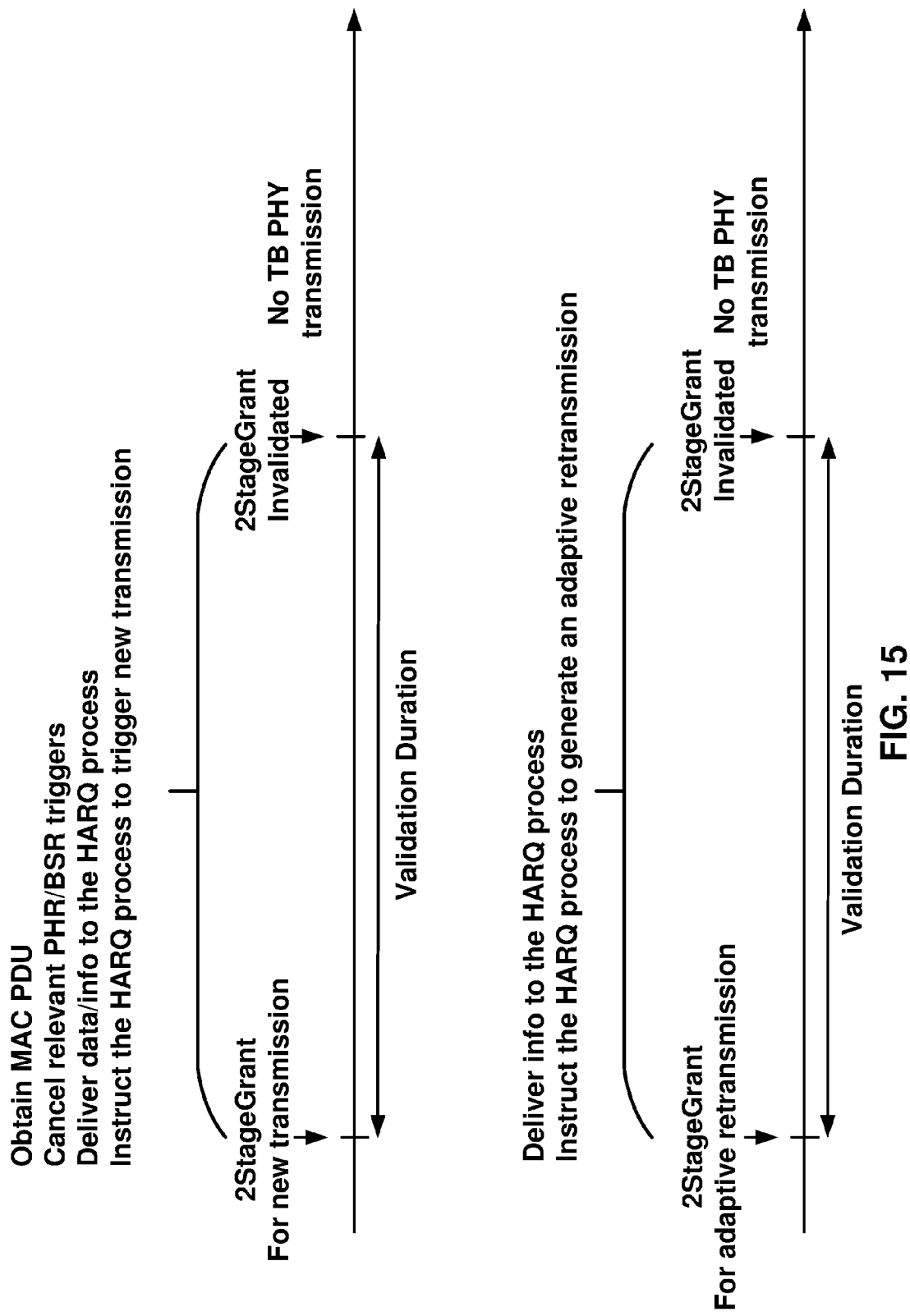
FIG. 15 is an example diagram depicting a PHR/BSR process when a two-stage grant is invalidated as per an aspect of an embodiment of the present disclosure.

An example diagram is shown in FIG. 13. In an example embodiment, the UE may perform MAC PDU packet processing after the first DCI grant of a two-stage DCI grant is received. The UE may process the first DCI grant and inform the HARQ entity about the grant. The UE may construct/create the MAC PDU (if a new transmission) comprising a PHR and inform the HARQ entity about the first DCI grant. In an example embodiment, a UE may invalidate the first DCI grant if no trigger B is received within a trigger validation duration, as shown in FIG. 15.

In an example, depending on the content of the DCI grant (which may determine a minimum subframes between the trigger B and transmission TTI) and/or depending on a UE capability, a UE may construct and process the MAC PDU before or after receiving the trigger B. In an example, depending on a parameter in the grant (parameter X, 2 bits) that determines a minimum time between the trigger and the TTI for the uplink transmission, the UE may determine whether the UE generates and/or processes the MAC PDU before or after the trigger B. In an example, when the minimum time between the trigger B and TTI for TB transmission is above k subframe (e.g. k=2, 4), the UE may generate and/or process the MAC PDU after it receives the trigger B. In an example embodiment, the MAC PDU may be processed before the trigger B is received regardless of the value of the parameter X.

In an example embodiment, a MAC entity may instruct the identified HARQ process for new transmission or adaptive retransmission. A UE MAC entity does not need to know about the actual TTI of the PHY transmission when a two-stage DCI grant is received. A MAC entity may record the first DCI grant and may process the grant before receiving a trigger B. In an example, if the first DCI grant is invalidated due to not receiving a trigger B, the UE MAC entity does not necessarily need to know about this. A UE MAC entity may not inform the HARQ entity that the first DCI grant is invalidated (when the MAC PDU is processed before the trigger).

In an example embodiment, if the MAC PDU is "a new transmission" and includes PHR, the UE may cancel MAC PHR triggers according to the PHR procedures. The UE may start the corresponding PHR timers according to the PHR procedures. In an example embodiment, the UE may create a MAC PDU including the PHR, cancel MAC PHR trigger(s) and start the corresponding PHR timers according to the PHR procedures even if the DCI grant is invalidated (e.g. by the PHY layer) due to not receiving the trigger B in the trigger validation duration. When the DCI grant is invalidated, the MAC PDU (TB) is not transmitted in any TTI. However, the MAC PDU TB including the PHR may be stored in the HARQ buffer. A MAC process may be performed regardless of whether the trigger B is received or not.

In an example embodiment, a MAC entity may obtain PHR values, instruct the multiplexing and assembly procedure to generate and transmit a PHR MAC control element, start the corresponding PHR according to the PHR procedures in a TTI. The TTI in which the PHR timers are restarted need to be determined. In an example, the UE may obtain PHR values, instruct the multiplexing and assembly procedure to generate and transmit a PHR MAC control element, and start the corresponding PHR timers at a predetermined reference TTI relative to the TTI of the uplink DCI grant. The UE and/or eNB may maintain PHR timer(s) and restart PHR timer(s) in the same reference TTI (if eNB maintains the timer). In an example embodiment, when the uplink DCI grant is received in subframe n, the UE may obtain PHR values, instruct the multiplexing and assembly procedure to generate and transmit a PHR MAC control element, and start the corresponding PHR timers in reference subframe n+k, wherein k is a predefined number, for example k=0, 1, 2 or 4.

Example embodiments provide an enhanced PHR process in which a PHR process is executed at a reference subframe which may be different from the TTI for uplink transmission. This enhanced process is performed regardless of whether the first DCI grant is invalidated or not. Implementation of the reference subframe, which could be different from uplink transmission subframe, provides advantages to both base station and the wireless device. The enhanced PHR process eliminates the impact of the uncertainty in the reception of trigger B and the timing of the uplink transmission TTI. Implementation of legacy PHR processes increases UE processing requirements when a two-stage grant is implemented in a wireless network. Example embodiments provides an enhanced PHR process for such implementation.

A wireless device may receive a first uplink DCI grant of a two-stage grant at a first subframe n. The MAC entity may perform a PHR process for a reference subframe (TTI) of n+k (e.g. k=4). If the MAC entity has UL resources allocated for new transmission; and if the power headroom reporting procedure determines that at least one PHR has been triggered and not cancelled, and; if the allocated UL resources can accommodate the MAC control element for PHR which the MAC entity is configured to transmit, plus its subheader, as a result of logical channel prioritization: the MAC entity may perform at least the following: a) obtain one or more values of Type 1 power headrooms for one or more serving cells; obtain one or more values of Type 2 power headrooms for one or more serving cells (e.g. PCell, PSCell, PUCCH SCell); instruct the multiplexing and assembly procedure to generate and transmit a PHR MAC control element based on value(s) reported by the physical layer; start or restart periodicPHR-Timer; start or restart prohibitPHR-Timer; cancel triggered PHR(s). If it is the first UL resource allocated for a new transmission since the last MAC reset, the MAC entity may start periodicPHR-Timer. The wireless device may store the MAC PDU comprising the PHR in a HARQ buffer. The wireless device may transmit the MAC PDU comprising the PHR in an uplink subframe in response to receiving a second DCI comprising a trigger B. The timing of the uplink subframe may depend at least on a timing of the second DCI and/or a subframe offset value.

In an example, a base station may transmit to a wireless device at least one message comprising configuration parameters of a plurality of cells comprising an LAA secondary cell configured with uplink transmissions. The wireless device receives a first uplink DCI grant of a two-stage uplink grant in a first subframe n for transmission in an uplink subframe of a serving cell c. The first uplink DCI grant comprises at least a first field and a first trigger field. The first field in the first uplink DCI grant indicates an assignment of resource blocks for transmissions via an uplink subframe of the LAA cell. A first trigger indicates that the first uplink DCI grant is triggered in response to a second DCI indicating a second trigger (trigger B). A timing of the uplink subframe is determined employing at least the second DCI.

The UE may report power headroom on the LAA cell using the first uplink DCI grant. The MAC entity may perform a PHR process for a reference TTI of n+k (e.g. k=4). In an example, the UE may obtain PHR values, instruct the multiplexing and assembly procedure to generate and transmit a PHR MAC control element, and start the corresponding PHR timers at a reference subframe n+k (e.g. k=4).

In an example, for a serving cell, computation/determination of PHR value(s) for a cell in a subframe depends on whether a MAC PDU transmission is considered for the cell in the subframe. In an example, a UE may construct and process the MAC PDU for transmission before or after receiving the trigger B. In an example, when a time between the trigger B and TTI for TB transmission is above k subframe (e.g. k=2, 4), the UE may generate and/or process the MAC PDU for transmission after it receives the trigger B.

In an example, when a trigger B for a serving cell is received at subframe n or earlier, the UE determines a PHR value for the serving cell assuming that a transmission is performed in the reference subframe. In an example, when a trigger B for a serving cell is received after subframe n, the UE determines a PHR value for the serving cell assuming that a transmission is not performed in the reference subframe.

The UE may process the uplink DCI grant and inform the HARQ entity about the uplink DCI grant. The UE may construct/create the PDU (if a new transmission) comprising a PHR and inform the HARQ entity about the uplink DCI grant. In an example embodiment, a UE may invalidate the uplink DCI grant if no trigger is received within a trigger validation duration.

In an example, if the MAC entity has UL resources allocated for new transmission, and if the power headroom reporting procedure determines that at least one PHR has been triggered and not cancelled, and; if the allocated UL resources can accommodate the MAC control element for PHR which the MAC entity is configured to transmit, plus its subheader, as a result of logical channel prioritization, the MAC entity may execute a power headroom process based on the RRC configuration parameters.

The MAC entity may start or restart periodicPHR-Timer; start or restart prohibitPHR-Timer; cancel triggered PHR(s); and if it is the first UL resource allocated for a new transmission since the last MAC reset, start periodicPHR-Timer.

If extendedPHR is configured: for activated serving cell(s) with configured uplink: obtain the value of the Type 1 power headroom; if the MAC entity has UL resources allocated for transmission on this serving cell for this TTI: obtain the value for the corresponding PCMAX,c field from the physical layer; if simultaneousPUCCH-PUSCH is configured: obtain the value of the Type 2 power headroom for the PCell; obtain the value for the corresponding PCMAX,c field from the physical layer; and instruct the multiplexing and assembly procedure to generate and transmit an Extended PHR MAC control element for extendedPHR based on the values reported by the physical layer.

If extendedPHR2 is configured: for activated serving cell(s) with configured uplink: obtain the value of the Type 1 power headroom. if the MAC entity has UL resources allocated for transmission on this serving cell for this TTI: obtain the value for the corresponding PCMAX,c field from the physical layer. If a PUCCH SCell is configured and activated: obtain the value of the Type 2 power headroom for the PCell and PUCCH SCell; obtain the values for the corresponding PCMAX,c fields from the physical layer. Else if simultaneousPUCCH-PUSCH is configured for the PCell: obtain the value of the Type 2 power headroom for the PCell; obtain the value for the corresponding PCMAX,c field from the physical layer. Instruct the Multiplexing and Assembly procedure to generate and transmit an Extended PHR MAC control element for extendedPHR2 according to configured ServCellIndex and the PUCCH(s) for the MAC entity based on the values reported by the physical layer;

If dualConnectivityPHR is configured: for activated serving cell(s) with configured uplink associated with any MAC entity: obtain the value of the Type 1 power headroom; if this MAC entity has UL resources allocated for transmission on this serving cell for this TTI or if the other MAC entity has UL resources allocated for transmission on this serving cell for this TTI and phr-ModeOtherCG is set to real by upper layers: obtain the value for the corresponding PCMAX,c field from the physical layer. If simultaneousPUCCH-PUSCH is configured: obtain the value of the Type 2 power headroom for the SpCell; obtain the value for the corresponding PCMAX,c field for the SpCell from the physical layer. Obtain the value of the Type 2 power headroom for the SpCell of the other MAC entity. If phr-ModeOtherCG is set to real by upper layers: obtain the value for the corresponding PCMAX,c field for the SpCell of the other MAC entity from the physical layer. Instruct the Multiplexing and Assembly procedure to generate and transmit a Dual Connectivity PHR MAC control element as defined in subclause 6.1.3.6b based on the values reported by the physical layer.

If regular power headroom is configured: obtain the value of the Type 1 power headroom from the physical layer; instruct the Multiplexing and Assembly procedure to generate and transmit a PHR MAC control element based on the value reported by the physical layer.

In an example embodiment, an uplink DCI grant may be a two-stage DCI grant. In a two-stage DCI grant, a timing of a trigger B and other parameters may determine the TTI for uplink transmissions. When two-stage DCI grants are implemented, the TTI of uplink transmissions corresponding to the uplink DCI grant is not known (at the time the DCI grant is received). In a two-stage DCI grant, if a trigger B is not received during a trigger validation duration after the two-stage DCI grant, the two-stage DCI grant may be invalidated. Current BSR process depends on the TTI that is employed for uplink TB transmission, which is not known to the UE at the time the DCI grant is received. The timing for calculating/determining BSR values, creating a MAC PDU including the BSR, and executing other BSR processes when two-stage grants are implemented results in uplink transmission issues and additional UE processing. Additionally, current BSR processes do not address a scenario when the two-stage DCI grant is invalidated (when the trigger B is not received during a trigger validation duration).

There is a need to provide an enhanced BSR process for uplink transmissions when two-stage uplink DCI grants are implemented in a wireless network. Example embodiments enhance calculation/determination of BSR values, generation of MAC PDU including a BSR, and BSR timer management when two stage grants are implemented. Example embodiments enhances BSR processes when two-stage grants are implemented.

In an example, the UE may deliver the uplink grant (as soon as it is available) and the associated HARQ information to the MAC entity for a TTI when a DCI grant is received even before the trigger B is received. This provides additional flexibility and enables a UE/MAC entity to start generation of MAC PDU including a BSR before trigger B is received. A MAC entity may consider the transmission to have been performed anyway regardless of whether the trigger B is received or not. The UE may construct and process (e.g. multiplex and/or encode, etc) the MAC PDU comprising a BSR MAC CE before a corresponding trigger B is received.

Figure 14:
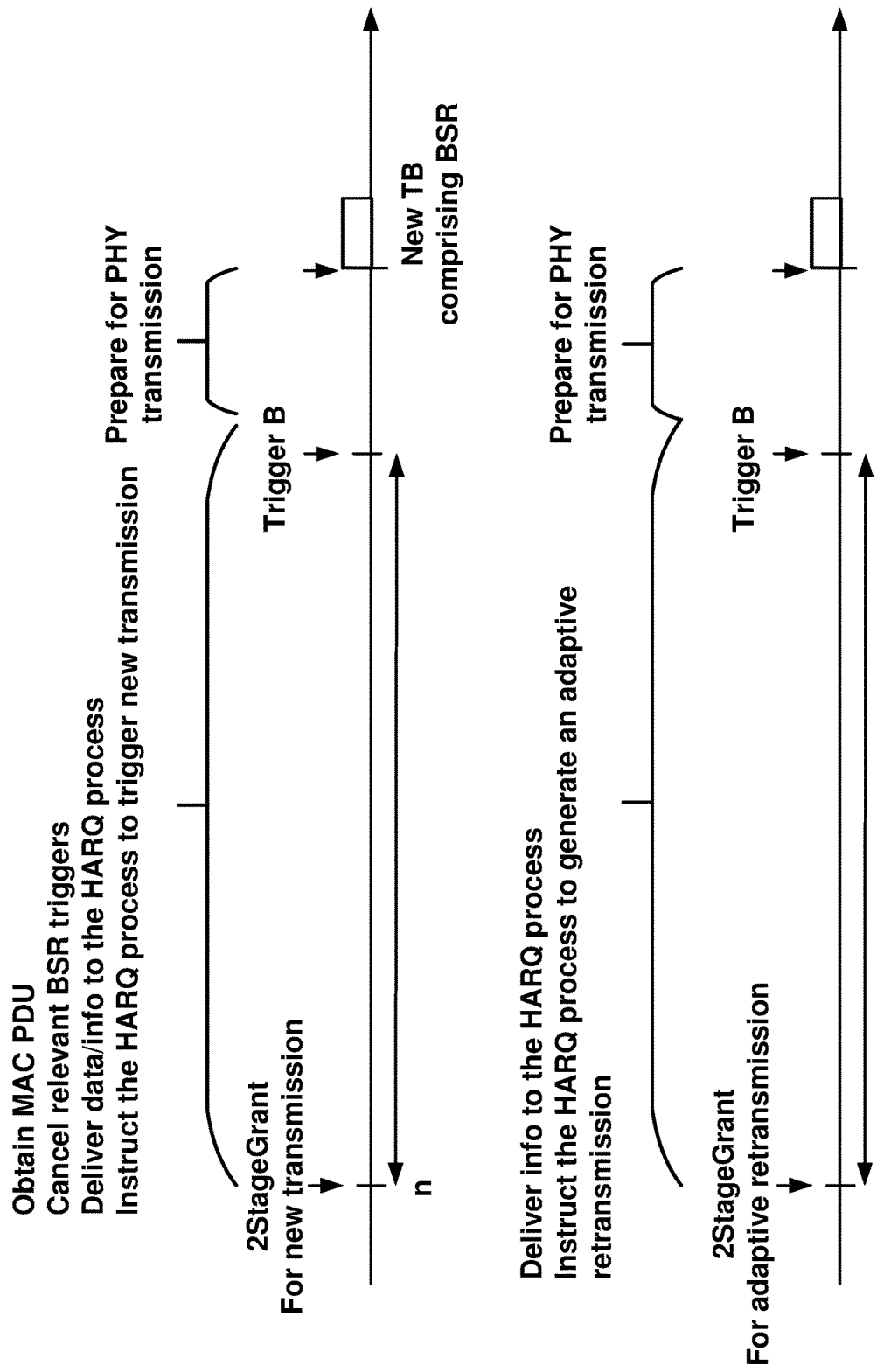
FIG. 14 is an example diagram depicting a BSR process for a two-stage grant as per an aspect of an embodiment of the present disclosure.

An example diagram is shown in FIG. 14. In an example embodiment, the UE may perform MAC PDU packet processing after the first DCI grant of a two-stage DCI grant is received. The UE may process the first DCI grant and inform the HARQ entity about the grant. The UE may construct/create the MAC PDU (if a new transmission) comprising a BSR and inform the HARQ entity about the first DCI grant. In an example embodiment, a UE may invalidate the first DCI grant if no trigger B is received within a trigger validation duration, as shown in FIG. 15.

In an example embodiment, if the MAC PDU is "a new transmission" and includes BSR, the UE may cancel MAC BSR trigger and start the corresponding BSR timers according to the BSR procedures. In an example embodiment, the UE may construct a MAC PDU comprising a BSR and cancel MAC BSR trigger according to the BSR procedures even if the DCI grant is invalidated (e.g. by the PHY layer) due to not receiving the trigger in the trigger validation duration. When the DCI grant is invalidated, the MAC PDU (TB) comprising BSR is not transmitted in any TTI. However, the TB may be stored in the HARQ buffer. A MAC process may be performed regardless of whether the trigger B is received or not.

In an example embodiment, a MAC entity may instruct the identified HARQ process for new transmission or adaptive retransmission. A UE MAC entity does not need to know about the actual TTI of the PHY transmission when a two-stage DCI grant is received. A MAC entity may record the first DCI grant and may process the grant before receiving a trigger B. In an example, if the first DCI grant is invalidated due to not receiving a trigger B, the UE MAC entity does not necessarily need to know about this. A UE MAC entity may not inform the HARQ entity that the first DCI grant is invalidated (when the MAC PDU is processed before the trigger).

In an example embodiment, the UE may construct a MAC PDU including a BSR and start the corresponding BSR timers according to the BSR procedures in a reference TTI. The reference TTI in which the MAC PDU comprising BSR is generated and the BSR timers are restarted need to be determined. In an example, the UE may generate a MAC PDU including a BSR and start the corresponding BSR timers at a predetermined reference TTI relative to a subframe in which the uplink DCI grant is received. The UE and/or eNB may maintain BSR timer(s) and restart BSR timer(s) in the same reference TTI (if eNB maintains BSR timers). In an example embodiment, when an uplink DCI grant is received in a first subframe n, corresponding BSR timer(s) may be restarted in a reference subframe n+k, wherein k is a predefined number, for example k=0, 1, 2 or 4. BSRs determined for a reference TTI may reflect the buffer status after MAC PDUs have been built for this reference TTI.

Example embodiments provide an enhanced BSR process in which a BSR process is executed at a reference subframe which may be different from the TTI for uplink transmission. This enhanced process is performed regardless of whether the first DCI grant is invalidated or not. Implementation of the reference subframe, which could be different from uplink transmission subframe, provides advantages to both base station and the wireless device. The enhanced BSR process eliminates the impact of the uncertainty in the reception of trigger B and the timing of the uplink transmission TTI. Implementation of legacy BSR processes increases UE processing requirements when a two-stage grant is implemented in a wireless network. Example embodiments provides an enhanced BSR process for such implementation.

In an example embodiment, a UE may generate a BSR and start the corresponding BSR timers according to the BSR procedures in a reference TTI. The reference TTI in which BSR is generated and the BSR timers are restarted need to be determined. In an example, the UE may generate a BSR and start the corresponding BSR timer(s) when the trigger is received. If the trigger is not received, MAC may generate a BSR and restart the corresponding timers when trigger is invalidated. The UE and/or eNB may maintain the BSR timer and restart the BSR timer in the same reference TTI (if eNB maintains the BSR timer). In an example embodiment, when the uplink DCI grant is received in a first subframe n, and a trigger B is received in subframe n+k, then the corresponding timer may be restarted in subframe n+k, for example k=4 or 8, or 12. BSRs determined for a reference TTI may reflect the buffer status after MAC PDUs have been built for this reference TTI.

The UE may process the uplink DCI grant and inform the HARQ entity about the uplink DCI grant. The UE may construct/create the PDU (if a new transmission) comprising a BSR and inform the HARQ entity about the uplink DCI grant. In an example embodiment, a UE may invalidate the uplink DCI grant if no trigger is received within a trigger validation duration.

In an example embodiment, a two stage DCI grant may be invalidated and corresponding at least one TB may not be transmitted. Implementation of legacy mechanisms may result in ignoring the two stage DCI grant and the at least one TB. This may result in inefficiencies and additional UE processing power. There is a need to implement enhanced MAC and PHY procedures for a scenario wherein a two-stage grant is invalidated when the second trigger is not received. Example embodiments reduces UE processing power and enhances uplink transmission for a two-stage grant, especially when the two-stage grant is invalidated.

Figure 16:
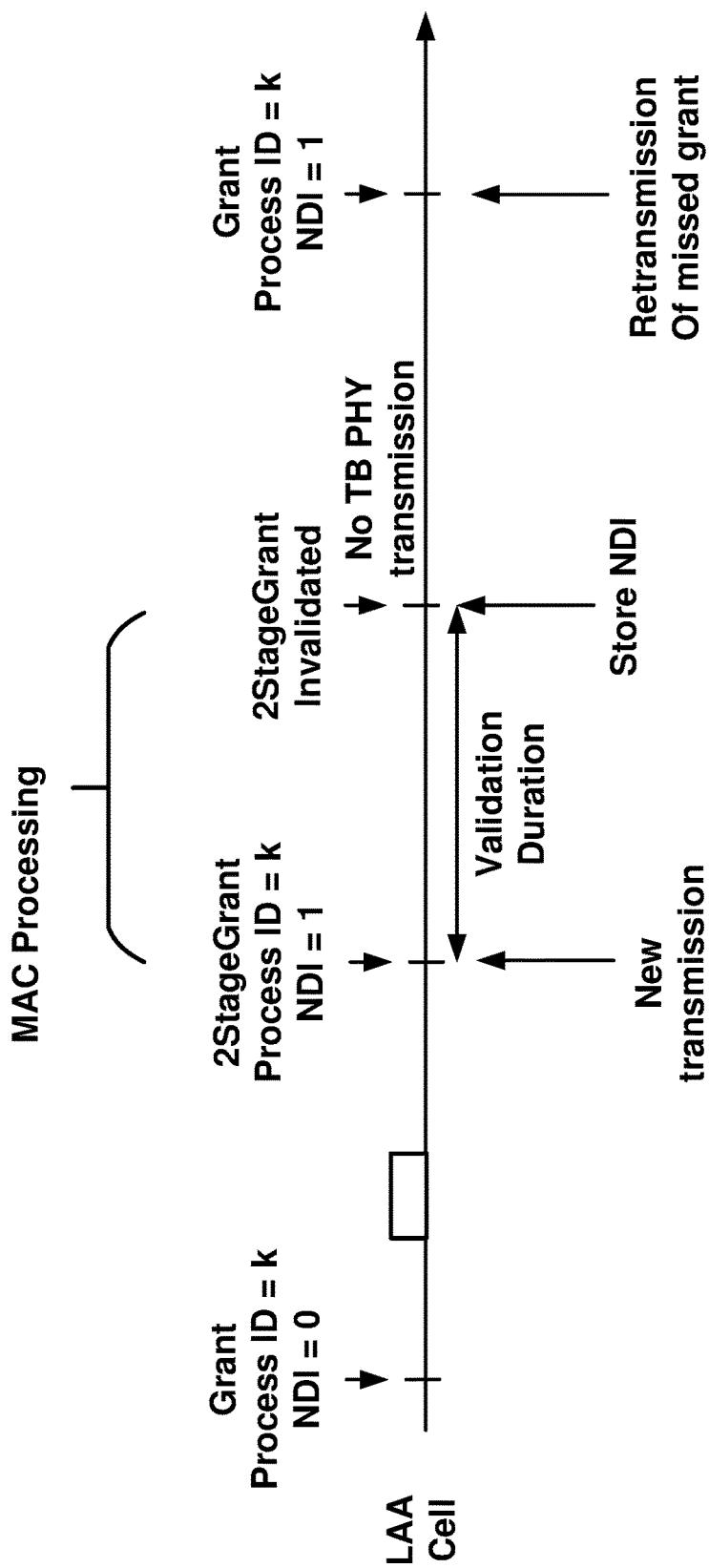
FIG. 16 is an example diagram depicting a MAC/PHY TB process for one or more two-stage grants as per an aspect of an embodiment of the present disclosure.

FIG. 16 shows an example embodiment for enhancing HARQ procedures when a two-stage DCI grant is implemented. In an example embodiment, when a trigger B is not received within a trigger validation duration, the first DCI grant in a two-stage DCI grant may be invalidated. In an example embodiment, the UE/eNB may store/save the value of the NDI and the HARQ process ID of the invalidated DCI grant and consider the stored NDI for the next DCI grant corresponding to the same HARQ process ID in order to determine whether NDI is toggle or not.

A wireless device may receive a first downlink control information (DCI) grant comprising a HARQ process ID equal to k. The first DCI grant may comprise: a first trigger field, and a validation field. The first trigger field may indicate that the first DCI is triggered in response to a second DCI comprising a second trigger. The validation field may indicate a validation duration for receiving the second DCI validating the first DCI. A medium access entity (MAC) may create one or more first transport blocks (TBs) in response to the first DCI. Examples are shown in FIG. 12 to FIG. 16. The wireless device may monitor for the second DCI during at least a portion of the validation duration. For example, the wireless device may monitor for the second DCI including the trigger until the trigger is received during the validation duration. In response to the monitoring not detecting the second DCI, the first DCI (2StageGrant) may be invalidated and transmission of the one or more transport blocks dropped (no TB PHY transmission). The MAC entity may consider, that the transmission of the one or more transport blocks to have been performed anyway. For example, the HARQ process ID and the NDI may be stored; and the one or more first TBs may be stored in a HARQ buffer.

In an example, when a UE receives an uplink DCI grant indicating an NDI value and a HARQ process ID, the UE determines whether the NDI provided in the associated HARQ process has been toggled compared to the value in the previous DCI grant of this HARQ process. This is regardless of whether the previous DCI grant is invalidated or not. When the NDI is not toggled, the NDI indicates that the DCI grant is for retransmission of the previous invalidated DCI grant. In an example, when the NDI is toggled, the NDI indicates that the DCI grant is for a new transmission of a new TB. For example, a third DCI indicating a same value of the HARQ process ID equal to k may be received. Uplink signals may be transmitted in response to the third DCI. The wireless device may employ the stored NDI to determine an adaptive-retransmission of the one or more first transport blocks or a new transmission of one or more second transport blocks. In example FIG. 16, the third DCI indicates a retransmission of the at least one TB associated with the missed (invalidated) grant.

FIG. 16 shows an example, wherein NDI is not toggled (the grant on the right) compared with the invalidated DCI grant (the DCI grant in the middle), but it is toggled compared with the previous valid DCI grant (the DCI grant on the left) in FIG. 16. The grant on the right is for retransmission of the TB that was constructed and stored in the HARQ buffer but could not be transmitted (was dropped) due to the invalidated DCI grant.

According to various embodiments, a device (such as, for example, a wireless device, off-network wireless device, a base station, and/or the like), may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 17:
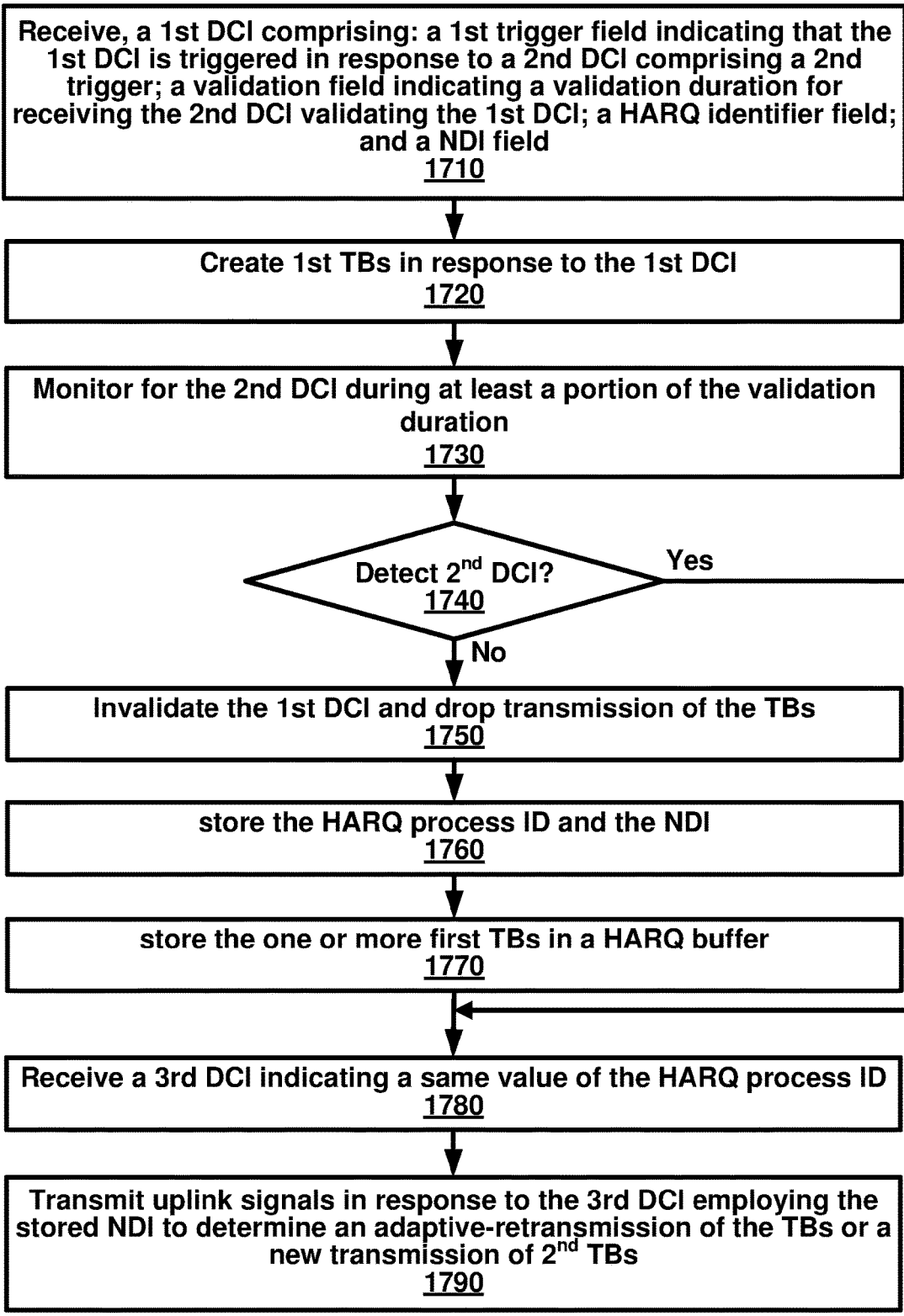
FIG. 17 is an example flow diagram as per an aspect of an embodiment of the present disclosure.

FIG. 17 is an example flow diagram as per an aspect of an embodiment of the present disclosure. A wireless device may receive a first downlink control information (DCI) at 1710. The first DCI may comprise: a first trigger field, a validation field, a hybrid retransmission request (HARQ) identifier field, and a new data identifier (NDI) field. The first trigger field may indicate that the first DCI is triggered in response to a second DCI comprising a second trigger. The validation field may indicate a validation duration for receiving the second DCI validating the first DCI. At 1720, one or more first transport blocks (TBs) may be created in response to the first DCI. At 1730, the wireless device may monitor for the second DCI during at least a portion of the validation duration. In response to the monitoring not detecting the second DCI (determined at 1740): the first DCI may be invalidated and transmission of the one or more transport blocks may be dropped at 1750; the HARQ process ID and the NDI may be stored at 1760; and the one or more first TBs may be stored in a HARQ buffer at 1770. At 1780, a third DCI indicating a same value of the HARQ process ID may be received. At 1790, uplink signals may be transmitted in response to the third DCI. The wireless device may employ the stored NDI to determine an adaptive-retransmission of the one or more first transport blocks or a new transmission of one or more second transport blocks.

According to an embodiment, the monitoring for the second DCI may be performed on a common search space of a control channel. According to an embodiment, the wireless device may further receive at least one message comprising configuration parameters of a plurality of cells comprising a licensed assisted access cell. According to an embodiment, the second DCI may correspond to a pre-defined radio network temporary identifier (RNTI). According to an embodiment, the second DCI may comprise: a subframe format field indicating a subframe format; and a subframe field indicating a subframe offset. According to an embodiment, the first DCI may further comprise a resource block assignment field indicating a resource block assignment for uplink transmission on a cell. According to an embodiment, the second DCI may comprise: a subframe format field indicating a subframe format; and a subframe field indicating a subframe offset. According to an embodiment, the third DCI may comprise: a second NDI field; and a second resource block assignment field indicating a second resource block assignment.

Figure 18:
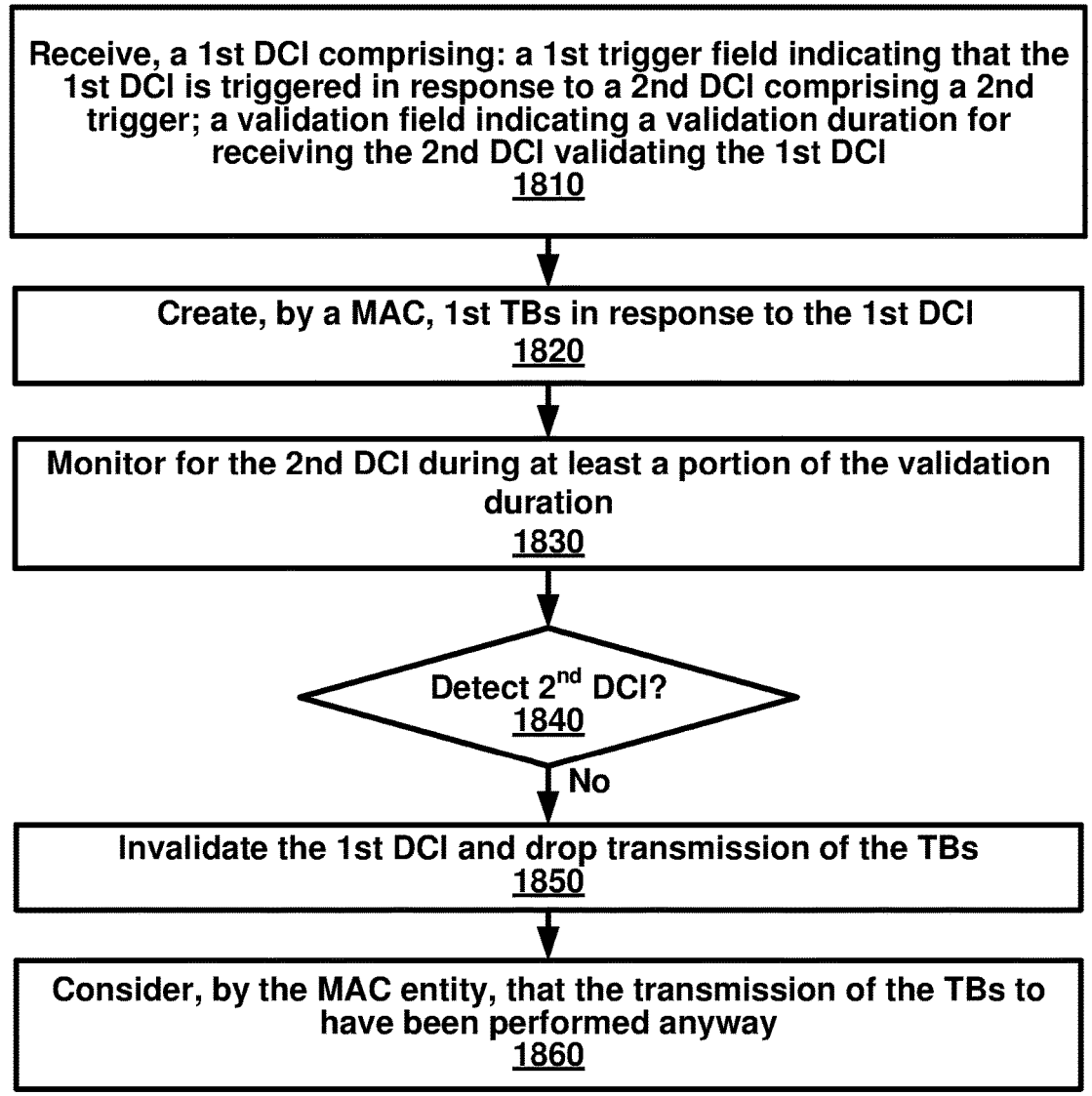
FIG. 18 is an example flow diagram as per an aspect of an embodiment of the present disclosure.

FIG. 18 is an example flow diagram as per an aspect of an embodiment of the present disclosure. A wireless device may receive a first downlink control information (DCI) at 1810. The first DCI may comprise: a first trigger field, and a validation field. The first trigger field may indicate that the first DCI is triggered in response to a second DCI comprising a second trigger. The validation field may indicate a validation duration for receiving the second DCI validating the first DCI. At 1820, a medium access entity (MAC) may create one or more first transport blocks (TBs) in response to the first DCI. At 1830 the wireless device may monitor for the second DCI during at least a portion of the validation duration. In response to the monitoring not detecting the second DCI (determined at 1840): the first DCI may be invalidated and transmission of the one or more transport blocks dropped at 1850. At 1860, the MAC entity may consider, that the transmission of the one or more transport blocks to have been performed anyway.

According to an embodiment, the first DCI may comprise: a hybrid retransmission request (HARQ) identifier field; and a new data identifier (NDI) field. According to an embodiment, when the MAC entity considers that the transmission of the one or more transport blocks have been performed, the wireless device may store the HARQ process ID and the NDI; and store the one or more first TBs in a HARQ buffer. According to an embodiment, the wireless device may further: receive a third DCI indicating a same value of the HARQ process ID; and transmit uplink signals in response to the third DCI. The wireless device may employ the stored NDI to determine an adaptive-retransmission of the one or more first transport blocks or a new transmission of one or more second transport blocks. According to an embodiment, the monitoring for the second DCI may be performed on a common search space of a control channel. According to an embodiment, the wireless device may further receive at least one message comprising configuration parameters of a plurality of cells comprising a licensed assisted access cell. According to an embodiment, the second DCI may correspond to a pre-defined radio network temporary identifier (RNTI). According to an embodiment, the second DCI may comprise: a subframe format field indicating a subframe format; and a subframe field indicating a subframe offset. According to an embodiment, the first DCI may further comprise a resource block assignment field indicating a resource block assignment for uplink transmission on a cell. According to an embodiment, the second DCI may comprise: a subframe format field indicating a subframe format; and a subframe field indicating a subframe offset. According to an embodiment, the third DCI may comprise: a second NDI field; and a second resource block assignment field indicating a second resource block assignment.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
   receiving, by a wireless device, a first downlink control information (DCI) comprising:
   a first trigger field indicating that the first DCI is triggered in response to a second DCI comprising a second trigger;
   a validation field indicating a validation duration for receiving the second DCI validating the first DCI;
   a hybrid retransmission request (HARQ) process identifier (ID) field; and
   a new data identifier (NDI) field;
   creating one or more first transport blocks (TBs) in response to the first DCI;
   monitoring for the second DCI during at least a portion of the validation duration;

in response to the monitoring not detecting the second DCI:
  invalidating the first DCI and dropping transmission of the one or more first TBs; and
  storing the HARQ process ID and the NDI;
  storing the one or more first TBs in a HARQ buffer;
receiving a third DCI indicating a same value of the HARQ process ID; and
transmitting uplink signals in response to the third DCI, wherein the wireless device employs the stored NDI to determine an adaptive-retransmission of the one or more first TBs or a new transmission of one or more second TBs.

2. The method of claim 1, wherein the monitoring for the second DCI is performed on a common search space of a control channel.

3. The method of claim 1, further comprising receiving, by the wireless device, at least one message comprising configuration parameters of a plurality of cells comprising a licensed assisted access cell.

4. The method of claim 1, wherein the second DCI corresponds to a pre-defined radio network temporary identifier (RNTI).

5. The method of claim 1, wherein the second DCI comprises:
  a subframe format field indicating a subframe format; and
  a subframe field indicating a subframe offset.

6. The method of claim 1, wherein the first DCI further comprises a resource block assignment field indicating a resource block assignment for uplink transmission on a cell.

7. The method of claim 6, wherein the second DCI comprises:
  a subframe format field indicating a subframe format; and
  a subframe field indicating a subframe offset.

8. The method of claim 1, wherein the third DCI comprises:
  a second NDI field; and
  a second resource block assignment field indicating a second resource block assignment.

9. A wireless device comprising:
  one or more processors;
  memory storing instructions that, when executed by the one or more processors, cause the wireless device to:
    receive a first downlink control information (DCI) comprising:
      a first trigger field indicating that the first DCI is triggered in response to a second DCI comprising a second trigger;
      a validation field indicating a validation duration for receiving the second DCI validating the first DCI;
      a hybrid retransmission request (HARQ) process identifier (ID) field; and
      a new data identifier (NDI) field;
    create one or more first transport blocks (TBs) in response to the first DCI;
    monitor for the second DCI during at least a portion of the validation duration;
    in response to the monitoring not detecting the second DCI:
      invalidating the first DCI and dropping transmission of the one or more first TBs; and
      storing the HARQ process ID and the NDI;
      storing the one or more first TBs in a HARQ buffer;
    receive a third DCI indicating a same value of the HARQ process ID; and
    transmit uplink signals in response to the third DCI, wherein the wireless device employs the stored NDI to determine an adaptive-retransmission of the one or more first TBs or a new transmission of one or more second TBs.

10. The wireless device of claim 9, wherein the monitoring for the second DCI is performed on a common search space of a control channel.

11. The wireless device of claim 9, wherein the instructions, when executed by the one or more processors, cause the wireless device to receive at least one message comprising configuration parameters of a plurality of cells comprising a licensed assisted access cell.

12. The wireless device of claim 9, wherein the second DCI corresponds to a pre-defined radio network temporary identifier (RNTI).

13. The wireless device of claim 9, wherein the second DCI comprises:
  a subframe format field indicating a subframe format; and
  a subframe field indicating a subframe offset.

14. The wireless device of claim 9, wherein the first DCI further comprises a resource block assignment field indicating a resource block assignment for uplink transmission on a cell.

15. The wireless device of claim 14, wherein the second DCI comprises:
  a subframe format field indicating a subframe format; and
  a subframe field indicating a subframe offset.

16. The wireless device of claim 9, wherein the third DCI comprises:
  a second NDI field; and
  a second resource block assignment field indicating a second resource block assignment.

17. A method comprising:
  receiving, by a wireless device, a first downlink control information (DCI) comprising:
    a first trigger field indicating that the first DCI is triggered in response to a second DCI comprising a second trigger;
    a validation field indicating a validation duration for receiving the second DCI validating the first DCI;
  creating, by a medium access entity (MAC), one or more first transport blocks (TBs) in response to the first DCI;
  monitoring for the second DCI during at least a portion of the validation duration; and
  in response to the monitoring not detecting the second DCI:
    invalidating the first DCI and dropping transmission of the one or more first TBs; and
    considering, by the MAC entity, that the transmission of the one or more first TBs to have been performed anyway.

18. The method of claim 17, wherein the first DCI comprises:
  a hybrid retransmission request (HARQ) process identifier (IC) field; and
  a new data identifier (NDI) field.

19. The method of claim 18, further comprising, when the MAC entity considers that the transmission of the one or more first TBs to have been performed:
  storing the HARQ process ID and the NDI; and
  storing the one or more first TBs in a HARQ buffer.

20. The method of claim 19, further comprising:
  receiving a third DCI indicating a same value of the HARQ process ID; and
  transmitting uplink signals in response to the third DCI, wherein the wireless device employs the stored NDI to determine an adaptive-retransmission of the one or more first TBs or a new transmission of one or more second TBs.

\* \* \* \* \*